(12) United States Patent
Yasui

(10) Patent No.: US 7,386,354 B2
(45) Date of Patent: Jun. 10, 2008

(54) APPARATUS AND METHOD FOR CONTROLLING A PLANT

(75) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 11/180,918

(22) Filed: Jul. 14, 2005

(65) Prior Publication Data

US 2006/0047349 A1    Mar. 2, 2006

(30) Foreign Application Priority Data

Aug. 30, 2004 (JP) ............................ 2004-249894

(51) Int. Cl.
- G05B 13/02 (2006.01)
- G05B 15/02 (2006.01)
- G05B 21/00 (2006.01)
- G06F 7/60 (2006.01)

(52) U.S. Cl. .................... 700/29; 700/34; 700/53; 700/83; 700/266; 703/2

(58) Field of Classification Search ............... 700/29, 700/34, 53, 83, 266; 703/2
See application file for complete search history.

(56) References Cited

U.S. PATENT DOCUMENTS

| | | | | |
|---|---|---|---|---|
| 4,425,614 A | * | 1/1984 | Barron et al. ................. | 700/38 |
| 4,868,754 A | * | 9/1989 | Matsumoto .................... | 701/99 |
| 5,172,312 A | * | 12/1992 | Iino et al. ..................... | 700/29 |
| 5,347,446 A | * | 9/1994 | Iino et al. ..................... | 700/29 |
| 5,535,117 A |   | 7/1996 | Hiroi | |
| 5,740,033 A | * | 4/1998 | Wassick et al. ................ | 700/29 |
| 5,751,571 A | * | 5/1998 | Tresp et al. .................... | 700/29 |
| 6,056,781 A |   | 5/2000 | Wassick et al. | |
| 6,487,459 B1 | * | 11/2002 | Martin et al. .................. | 700/44 |

(Continued)

FOREIGN PATENT DOCUMENTS

JP    11-73206    3/1999

(Continued)

OTHER PUBLICATIONS

Montestruque et al., "Model-Based Networked Control Systems Stability" 2001 Univ of Notre Dame p. 1-58.*

(Continued)

Primary Examiner—David Vincent
Assistant Examiner—Thomas Stevens
(74) Attorney, Agent, or Firm—Arent Fox LLP

(57) ABSTRACT

A control for a modeled plant is provided. The modeled plant is represented by a model expression that is based on an input into the plant, an output from the plant, model parameters, and an estimated value for disturbance that is applied to the plant. The model expression includes a term in which the estimated disturbance value is multiplied by at least one of the model parameters. The model parameters are identified. The estimated disturbance value is calculated so that an error between a model output that is calculated based on the model expression and an actual output of the plant is minimized. The input into the plant is calculated based on the model expression so as to control the plant. Thus, the estimated disturbance value is directly reflected in the input into the plant without being calculated by any of the model parameters.

16 Claims, 16 Drawing Sheets

U.S. PATENT DOCUMENTS

2003/0097193 A1     5/2003    Makino et al.
2004/0049296 A1*   3/2004    Hashimoto et al. ........... 700/28

FOREIGN PATENT DOCUMENTS

JP          2003-5804       1/2003

OTHER PUBLICATIONS

Bequette-B.W., "Process Control, Modeling, Design, and Simulation" 2003, p. 2, 156,157,263-271,273,277,279,703-707.*

Barnes & Nobel, Bequette-B.W., "Process Control, Modeling, Design, and Simulation" Dec. 2003 abstract, p. 1.*

* cited by examiner (a)

(b)

(a)

(b)

(a)

(b)

APPARATUS AND METHOD FOR CONTROLLING A PLANT

BACKGROUND OF THE INVENTION

The present invention relates to an apparatus and method for controlling a plant.

Several techniques for controlling an object modeled using a model parameter (such an object is also called a plant) have been proposed. Considering disturbance that may be applied to the plant, an estimated value of the disturbance (which will be hereinafter referred to as an estimated disturbance value) can be included in the model expression for the plant.

According to a control technique described in Japanese Patent Application Publication No. 2003-5804, reference values for the model parameters, including the above estimated disturbance value, are scheduled in accordance with an engine condition parameter (for example, a throttle valve opening) that is in a correlation with the model parameters. An identifier, which is introduced in a control apparatus, recursively identifies the model parameters and the estimated disturbance value based on the scheduled model parameters. A control input into the plant is calculated based on the identified model parameters and estimated disturbance value. Such a control technique has an advantage that the model parameters can be caused to converge to their optimum values while minimizing a delay even when the engine condition parameter changes.

Depending on the type of the plant, some model parameters need to be changed by a relative large amount so as to cause an actual output of the plant to appropriately converge to a desired value when the engine condition parameter changes. The estimated disturbance value may largely vary due to such a large change of the model parameters.

For example, in the case where the model parameters and the estimated disturbance value are recursively identified, the estimated disturbance value may largely change due to changes of the model parameters if the identification speed for the model parameters is different from the identification speed for the estimated disturbance value. Further, in the case where model parameters are recursively identified based on the scheduled parameters, the estimated disturbance value may largely change if the values of the scheduled parameters change in accordance with a change of the engine condition parameter.

Such a large change of the estimated disturbance value may change a term associated with the estimated disturbance value in the control input equation. As a result, a steady state error may occur between an output of the model and an actual output of the plant. In order to suppress such a steady state error, the amount of change of the model parameters needs to be minimized. However, such minimization may impair the above-described advantages.

Therefore, there is a need for a control that can suppress such a steady state error that may be caused by change of an estimated disturbance value while minimizing the time required for causing model parameters to converge to their optimum values.

SUMMARY OF THE INVENTION

The present invention provides a control apparatus and a method for controlling a modeled plant. The modeled plant is represented by a model expression that is based on an input into the plant, an output from the plant, model parameters and an estimated value of disturbance that is applied to the plant. The model expression includes a term in which the estimated disturbance value is multiplied by at least one of the model parameters. The model parameters are identified. The estimated disturbance value is calculated so that an error between a model output that is calculated based on the model expression and an actual output of the plant is minimized. The input into the plant is calculated based on the model expression to control the plant. By calculating the input into the plant based on the model expression including a term in which the estimated disturbance value is multiplied by at least one of the model parameters, the estimated disturbance value is reflected in the input into the plant without being calculated by the model parameters.

By including in the model expression the term in which the estimated disturbance value is multiplied by the model parameter, the estimated disturbance value is reflected in the input into the plant without being calculated by the model parameter. Thus, it can be prevented that the estimated disturbance value is influenced by a change of the model parameters. A steady state error that may occur due to a change of the estimated disturbance value can be suppressed.

According to one embodiment of the invention, the model parameters are identified so that an error between a model output that is calculated based on the model expression and an actual plant output is minimized.

According to another embodiment of the invention, the model parameters include at least one scheduled model parameter having a value that is predetermined in accordance with a condition of the plant. The scheduled parameter can be stored in, for example, a storage device. The scheduled parameter can be extracted based on a detected plant condition.

According to one embodiment of the invention, the model parameter is identified by correcting the extracted scheduled model parameter so that an error between a model output that is calculated based on the model expression and an actual plant output is minimized.

According to one embodiment of the invention, a reference value of the estimated disturbance value is predetermined in accordance with a condition of the plant. The reference value of the estimated disturbance value is extracted based on a detected plant condition. The estimated disturbance value is calculated based on the extracted reference value of the estimated disturbance value.

According to one embodiment of the invention, the plant is a variable phase mechanism that is capable of changing a phase of a cam of an engine. According to another embodiment of the invention, the plant is a variable lift mechanism that is capable of changing a lift amount of a valve of an engine. According to one embodiment of the invention, the plant is a variable compression ratio mechanism that is capable of changing a compression ratio of an engine.

DESCRIPTION OF THE PREFERRED EMBODIMENTS

Figure 1:
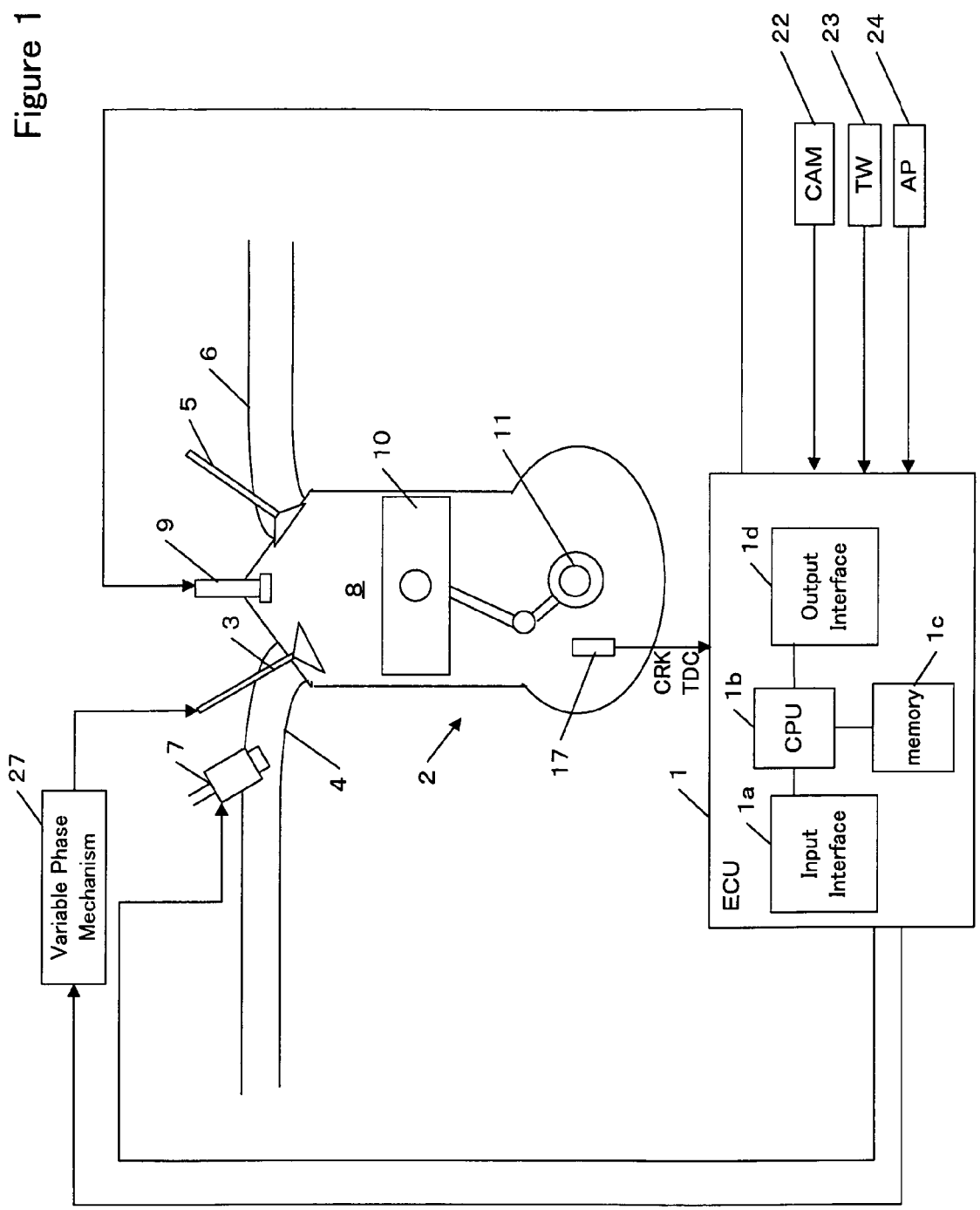
FIG. 1 is a block diagram showing an overall structure of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1a for receiving data sent from each part of the vehicle, a CPU 1b for carrying out operations for controlling each part of the vehicle, a memory 1c including a read only memory (ROM) and a random access memory (RAM), and an output interface id for sending a control signal to each part of the vehicle. Programs and various data for controlling each part of the vehicle are stored in the ROM. One or more programs and data for performing a control in accordance with the invention are also stored in the ROM. The ROM may be a rewritable ROM such as an EPROM. The RAM provides work areas for operations by the CPU 1b, in which data sent from each part of the vehicle as well as a control signal to be sent out to each part of the vehicle are temporarily stored.

An engine 2 is, for example, a 4-cylinder, 4-cycle engine. One of the cylinders is shown in the figure. The engine 2 is connected to an air intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4. A spark plug 9 is provided in a combustion chamber 8 to ignite a spark in accordance with an ignition timing signal from the ECU 1.

The engine 2 takes air-fuel mixture from air taken from the intake manifold 4 and fuel injected by the fuel injection valve 7 into the combustion chamber 8. The air-fuel mixture is combusted by the spark ignited by the spark plug 9. The combustion increases the volume of the mixture, which pushes downward on the piston 10. The reciprocating motion of the piston 10 is converted into the rotation motion of the crankshaft 11.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with a TDC (top dead center) position of a piston 10.

A cam angle sensor 22 is connected to the ECU 1. The cam angle sensor 22 outputs a pulse signal CAM to the ECU 1 at every predetermined cam angle in accordance with the rotation of a camshaft (not shown) connected to the intake valve 3 through an intake cam.

In this example, the engine has four cylinders and a TDC signal is issued for each cylinder. Therefore, the TDC signal is detected each time the crank shaft 11 rotates 90 degrees. The CAM signal is detected each time the camshaft rotates 90 degrees. The ECU 1 calculates a phase difference of the CAM signal relative to the TDC signal, that is, calculates an actual phase CAIN of the camshaft relative to the crankshaft 11.

An engine water temperature (TW) sensor 23 is attached to the cylinder peripheral wall, which is filled with cooling water, of the cylinder block of the engine 2. A temperature of the engine cooling water detected by the TW sensor 10 is sent to the ECU 1.

An accelerator pedal opening (AP) sensor 24 is connected to the ECU 1. The accelerator pedal opening sensor 24 detects the opening angle of the accelerator pedal and sends it to the ECU 1.

A variable phase mechanism (which is called a VTC) 27 is a mechanism that is capable of changing an opening/closing timing of the intake valve 3 in accordance with a control signal from the ECU 1. The variable phase mechanism 27 can be implemented by any appropriate known technique. The variable phase mechanism 27 can be also configured to change the phase of the exhaust valve 5. An example of the phase mechanism 27 used in the embodiment will be described later referring to FIG. 2.

Signals sent to the ECU 1 are passed to the input interface 1a. The input interface 5a converts analog signal values into digital signal values. The CPU 1b processes the resulting digital signals, performs operations in accordance with one or more programs stored in the memory 1c, and creates control signals. The output interface id sends these control signals to actuators for the fuel injection valve 7, spark plug 9, variable phase mechanism 27, and other mechanical components.

Figure 2:
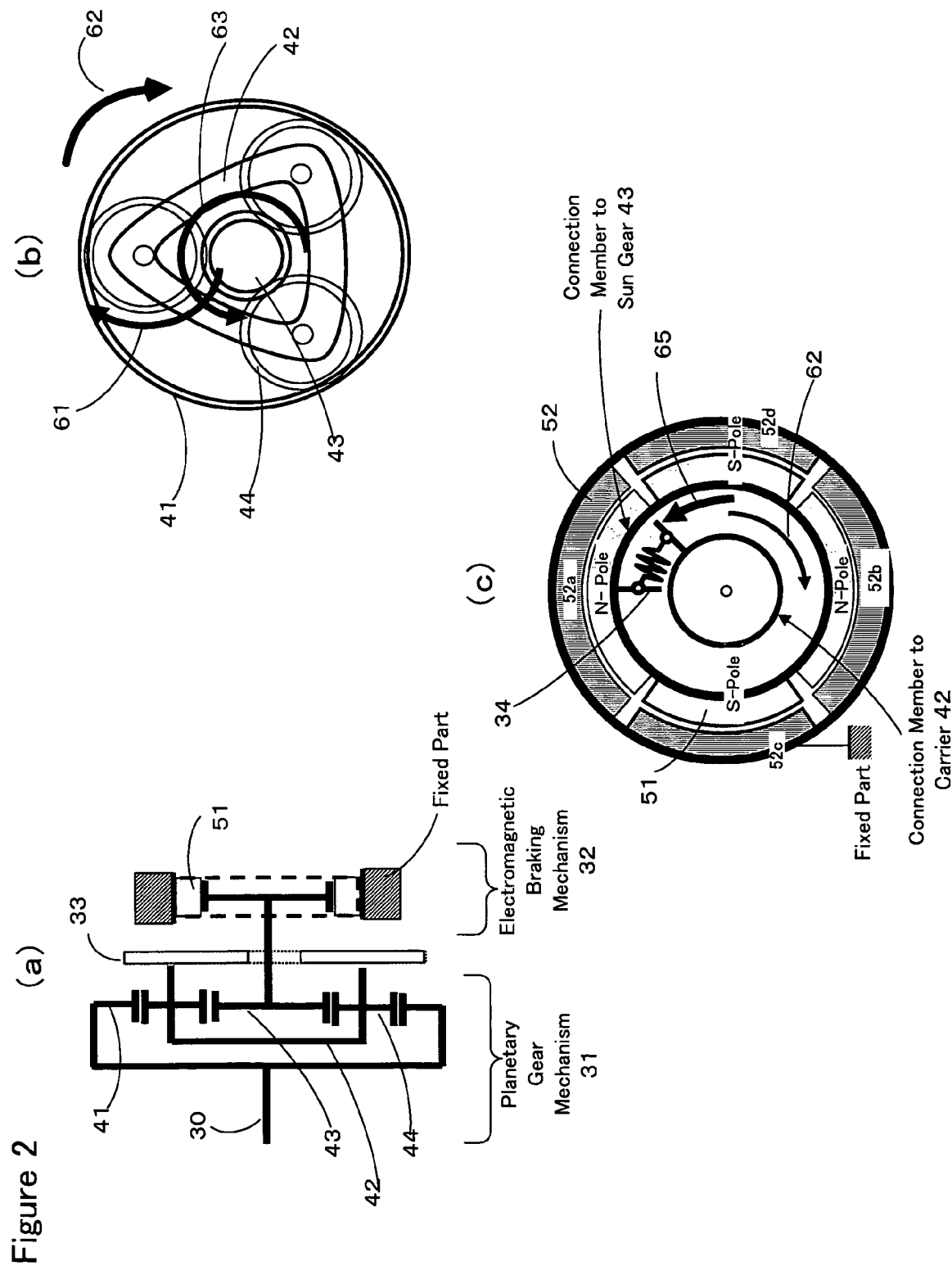
FIG. 2 schematically shows a variable phase mechanism in accordance with one embodiment of the present invention.

FIG. 2 shows the variable phase mechanism 27 in accordance with one embodiment of the present invention. FIG. 2(a) shows a side view of the variable phase mechanism 27. The variable phase mechanism 27 comprises a planetary gear mechanism 31 and an electromagnetic braking mechanism 32. FIG. 2(b) shows a front view of the planetary gear mechanism 31. FIG. 2(c) shows a front view of the electromagnetic braking mechanism 32.

The planetary gear mechanism 31 includes a ring gear 41 connected to the camshaft 30, a carrier 42 connected to a sprocket 33, and a sun gear 43 connected to the electromagnetic braking mechanism 32. The sprocket is connected to the crankshaft 11 through a chain or the like so as to receive the rotation force from the crankshaft 11. A plurality of planetary gears 44 are rotatably supported by the carrier 42 and are engaged with the ring gear 41 and the sun gear 43.

The electromagnetic braking mechanism 32 has a permanent magnet 51, an electromagnet 52 and a return spring 34. In FIG. 2(c), the permanent magnet 51 is shown by dot-hatched area. N-poles and S-poles are alternately arranged. The permanent magnet 51 is connected to the sun gear 43 through a connection member. The electromagnet 52 is disposed outside of the permanent magnet 51 as shown by line-hatched area. The electromagnet 52 is connected to an actuator (not shown). A control of energization applied to the electromagnet 52 can switch the magnetic polarity of the electromagnet 52 between N and S. The return spring 34 is connected between the connection member to the sun gear 43 and the connection member to the carrier 42.

If the carrier rotates in the direction of arrow 61 in accordance with the rotation of the sprocket 33 when the electromagnet 52 is de-energized by the actuator, the ring gear 41 rotates in the direction of arrow 62 in accordance with the rotation of the carrier 42, which causes the camshaft 30 to rotate. The sun gear 43 freely rotates in the direction of arrow 63. In this situation, a phase of the cam is most retarded relative to the sprocket.

If the electromagnet 52 is energized by the actuator so that portions 52a and 52b of the electromagnet are N-pole and portions 52c and 52d are S-pole, N-pole and S-pole of the permanent magnet 51 are drawn to S-pole and N-pole of the electromagnet, respectively. As a result, a braking force 65 is applied to the connection member of the sun gear 43 against the biasing force of the return spring 34.

A rotational speed of the carrier 42 is limited by a rotational speed of the sprocket 33. A relative rotational speed of the sun gear 43 to the carrier 42 is increased by the braking force 65. By the principle of operation of the planetary gears, as the relative rotational speed of the sun gear to the carrier 42 increases, the relative rotational speed of the ring gear 41 to the carrier 42 increases. That is, a relative rotational speed of the camshaft 30 to the sprocket 33 increases. As a result, the rotation of the camshaft 30 is advanced relative to the sprocket 33.

Thus, the phase of the camshaft 30 can be controlled to a desired value by controlling the braking force 65 to the sun gear 43 through the energization of the electromagnet 52. The actuator receives a desired phase from the ECU 1 and controls the energization applied to the electromagnet so as to achieve the desired phase.

An Example of Conventional Control

For the purpose of better understanding the present invention, calculating a control input into a plant in accordance with a conventional control will be described below.

Figure 3:
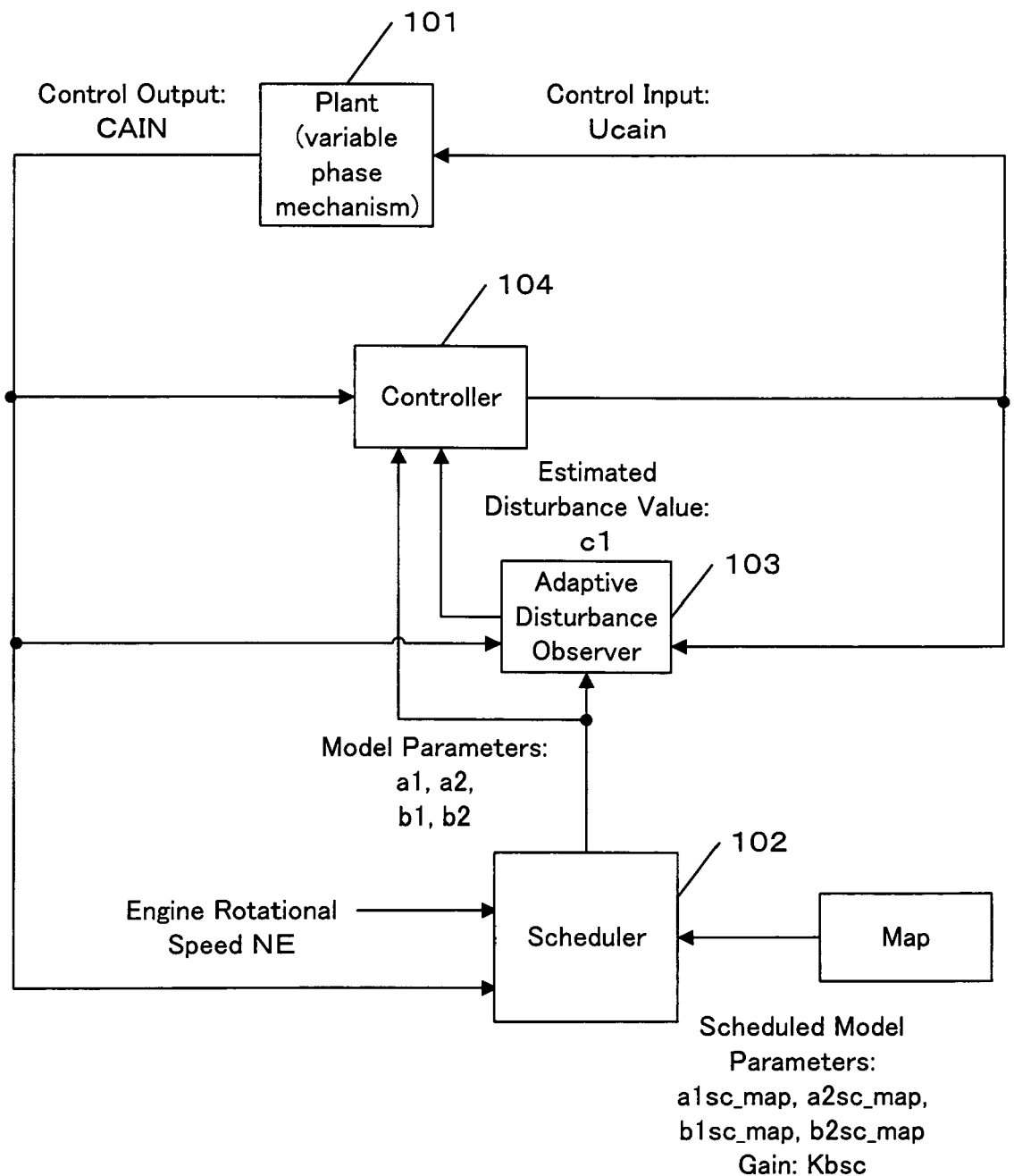
FIG. 3 is a block diagram of a control apparatus in accordance with a first embodiment of the present invention.

FIG. 3 is a block diagram of an example of an apparatus for controlling a plant in accordance with a conventional technique. The functions of a scheduler 102, adaptive disturbance observer 103 and a controller 104 can be implemented in the ECU 1. In one embodiment, the functions are typically implemented by one or more computer programs stored in the memory 1c of the ECU 1. Alternatively, the functions may be implemented by software, hardware, firmware or any combination thereof.

In this example, a plant 101 is, for example, a variable phase mechanism 27 as shown in FIG. 2. A control input Ucain into the variable phase mechanism 27 is a control signal for energizing the electromagnet 52. A control output is the above-described actual phase CAIN. The plant 101 can be represented by a model expression shown by the equation (1). k represents a control cycle.

$$CAIN(k+1) = a1 \cdot CAIN(k) + a2 \cdot CAIN(k-1) + b1 \cdot Ucain(k) + b2 \cdot Ucain(k-1) \quad (1)$$

a1, a2, b1 and b2 are model parameters. Disturbance may be applied to the plant 101. Assuming that such disturbance is represented by c1, the model expression (1) is rewritten to the equation (2). c1 is called an estimated disturbance value.

$$CAIN(k+1) = a1 \cdot CAIN(k) + a2 \cdot CAIN(k-1) + b1 \cdot Ucain(k) + b2 \cdot Ucain(k-1) + c1 \quad (2)$$

Figure 4:
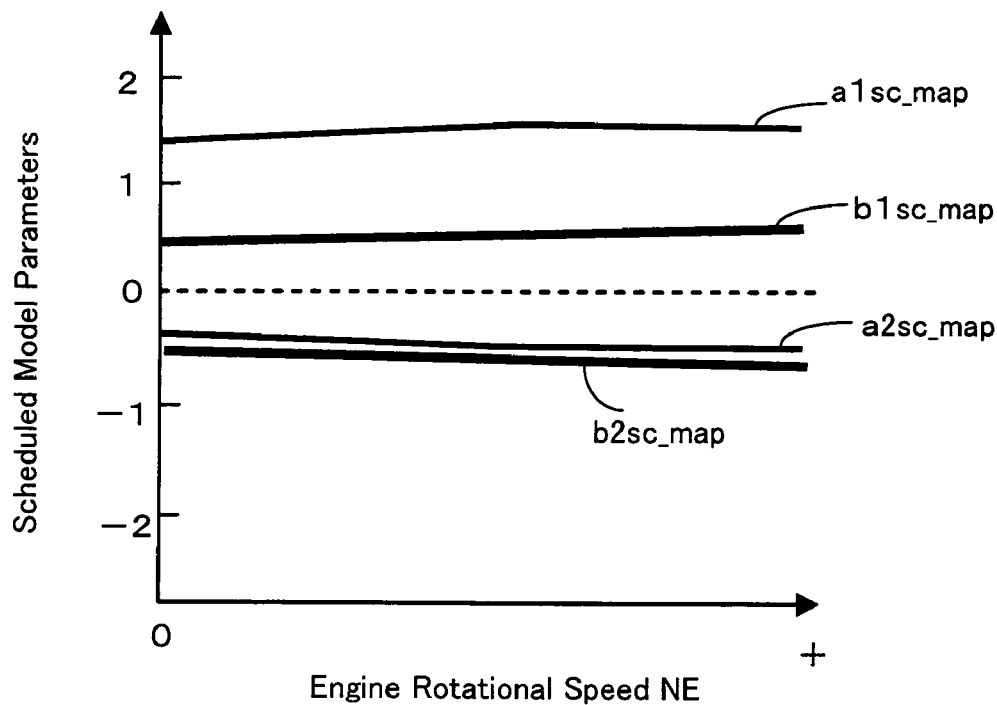
FIG. 4 shows maps used for determining scheduled model parameters in accordance with the first embodiment of the present invention.
Figure 4:
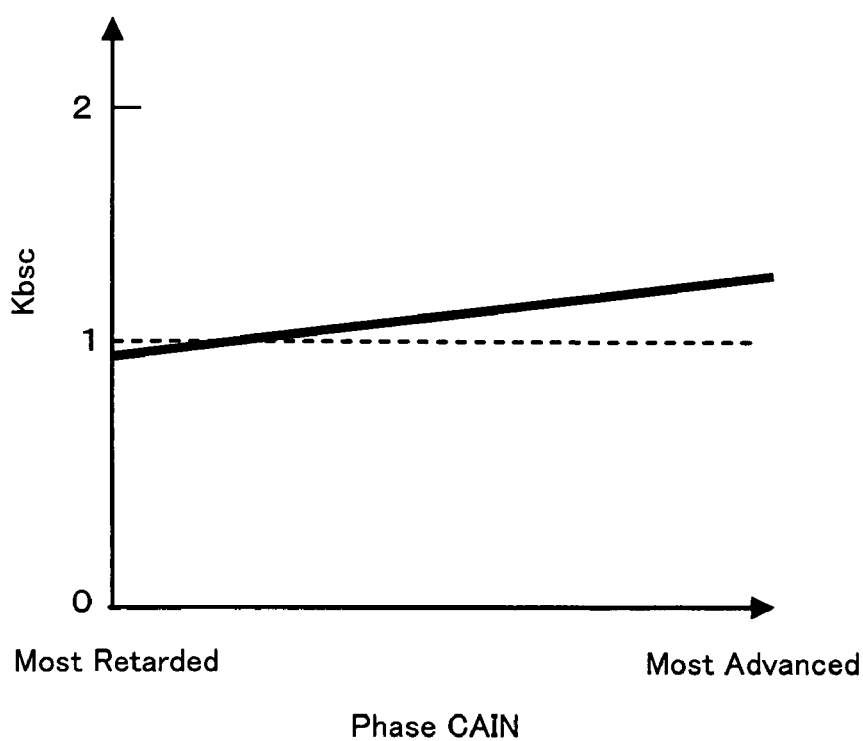

Model parameters corresponding to the operating condition of the engine are stored in advance as a table or a map in the memory 1c of the ECU 1. One example of such a map is shown in FIG. 4(a). A scheduler 102 refers to the map based on a detected engine rotational speed NE to extract scheduled model parameters a1sc_map, a2sc_map, b1sc_map and b2sc_map corresponding to the engine rotational speed NE. As shown in the equations (1-1) and (1-2), the scheduler 102 substitutes the extracted model parameters a1sc_map and a2sc_map into the model parameters a1 and a2, respectively. The scheduler further extracts a gain Kbsc by referring to a map as shown in FIG. 4(b) based on a detected phase CAIN. Model parameters b1 and b2 are calculated by multiplying the scheduled model parameters b1sc_map and b2sc_map by the gain Kbsc (equations (1-3) and (1-4)). Thus, scheduling the model parameters in a map enables the model parameters to be rapidly identified.

$$a1(k) \leftarrow a1sc\_map(k) \quad (1-1)$$

$$a2(k) \leftarrow a2sc\_map(k) \quad (1-2)$$

$$b1(k) \leftarrow b1sc\_map \times Kbsc(k) \quad (1-3)$$

$$b2(k) \leftarrow b2sc\_map \times Kbsc(k) \quad (1-4)$$

An adaptive disturbance observer 103 recursively calculates the estimated disturbance value c1. In this example, a recursive least squares algorithm is used to calculate the estimated disturbance value c1. The equations (1-11) to (1-15) for the calculation are shown.

$$c1(k) = c1(k-1) + \frac{Pdov}{1+Pdov} e\_dov(k) \quad (1-11)$$

$$e\_dov(k) = CAIN(k) - CAIN\_hat(k) \quad (1-12)$$

$$CAIN\_hat(k) = \theta^T(k)\zeta(k) \quad (1-13)$$

$$\theta^T(k) = [a1(k) \; a2(k) \; b1(k) \; b2(k) \; c1(k-1)] \quad (1-14)$$

$$\zeta^T(k) = [CAIN(k-1) \; CAIN(k-2) \; Ucain(k-1) \; Ucain(k-2) \; 1] \quad (1-15)$$

Pdov is an identification gain that has a predetermined value. e_dov represents an error between a current actual phase CAIN(k) and an estimated phase value CAIN_hat(k) that is calculated based on the model expression (2). That is, e_dov represents an error between an actual output of the plant and an output of the model. The adaptive disturbance observer 103 uses the recursive least squares algorithm to determine the estimated disturbance value c1 so that the error e_dov is minimized. Since the least squares algorithm is known, its detailed description will be omitted.

A controller 104 calculates a control input Ucain based on the model expression (2) in which the model parameters a1, a2, b1 and b2 and the estimated disturbance value c1 are substituted. In this example, a 2-degree-of-freedom response assignment control is used to calculate the control input. The equations (1-21) to (1-26) for the calculation are shown.

$$Ucain(k) = Ueq(k) + Urch(k) \tag{1-21}$$

$$Ueq(k) = \frac{1}{b1(k)}\{(1 - a1(k) - POLE)CAIN(k) + \tag{1-22}$$
$$(POLE - a2(k))CAIN(k-1) - b2(k)Ucain(k-1) - c1(k) +$$
$$CAIN\_cmd\_f(k) + (POLE - 1)CAIN\_cmd\_f(k-1) -$$
$$POLE \, CAIN\_cmd\_f(k-2)\}$$

$$Urch(k) = -\frac{Krch}{b1(k)}\sigma(k) \tag{1-23}$$

$$\sigma(k) = Ecain(k) + POLE \, Ecain(k-1) \tag{1-24}$$

$$Ecain(k) = CAIN(k) - CAIN\_cmd\_f(k-1) \tag{1-25}$$

$$CAIN\_cmd\_f(k) = \tag{1-26}$$
$$POLE\_f \cdot CAIN\_cmd\_f(k-1) + (1 + POLE\_f)CAIN\_cmd(k)$$

The response assignment control is a control that is capable of assigning a speed and behavior that a controlled variable (in this example, an actual phase) converges to a desired value when disturbance is applied. The 2-degree-of-freedom response assignment control is an expanded version of the response assignment control. According to the 2-degree-of-freedom response assignment control, the speed that the controlled variable converges to a desired value and the speed that the controlled variable follows a desired value can be separately assigned.

Referring to the above-described equations, a desired value response assignment parameter POLE_f is used to apply a first-order delay filter (low-pass filter) to the desired value CAIN_cmd (equation (1-26)). Thus, a new desired value CAIN_cmd_f is calculated. The desired value response assignment parameter POLE_f defines the speed that the controlled variable follows the desired value. Preferably, it is set to satisfy −1<POLE_f<0. The trajectory of the desired value CAIN_cmd_f is specified by the desired value response assignment parameter POLE_f. The speed that the controlled variable follows the desired value can be specified in accordance with what trajectory is set for the desired value.

The controller 104 further defines a switching function σ (equation (1-24)). Ecain is an error between the actual phase CAIN and the desired value CAIN_cmd_f (equation (1-25)). The switching function σ specifies a convergence behavior of the error Ecain. POLE is a response assignment parameter for suppressing disturbance. It specifies a convergence speed of the error Ecain when disturbance is applied. Preferably, POLE is set to satisfy −1<POLE<0.

Now, the switching function σ and the response assignment parameter POLE will be described. In the 2-degree-of-freedom response assignment control, the control input Ucain is determined so that the switching function σ becomes zero.

$$\sigma(k) = 0 \tag{1-27}$$
$$\Downarrow$$
$$Ecain(k) = -POLE \cdot Ecain(k-1)$$

The equation (1-27) represents a first-order delay system having no input. In other words, the 2-degree-of-freedom response assignment control controls the controlled variable Ecain so that it is confined in the first-order delay system shown in the equation (1-27).

Figure 5:
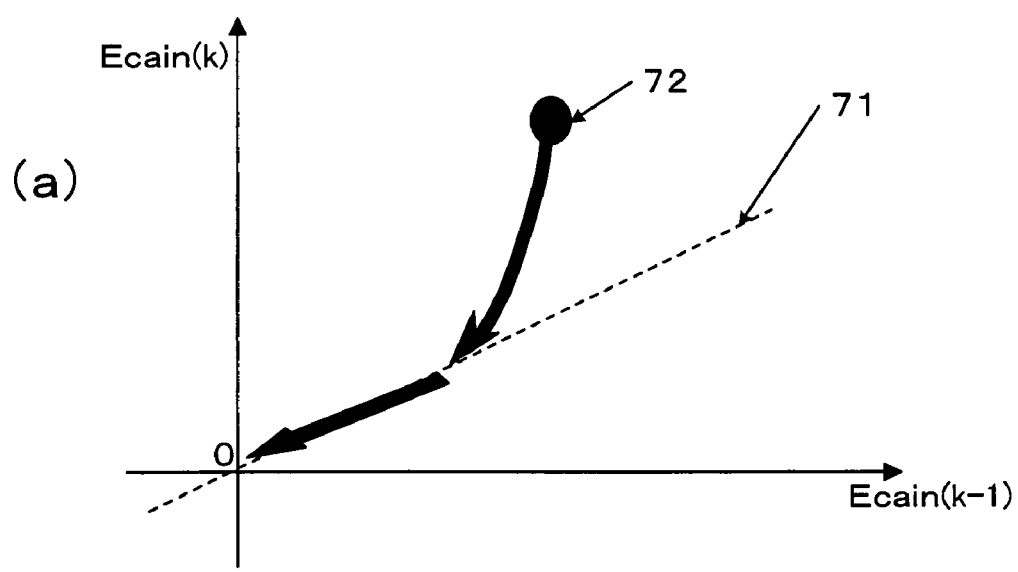
FIG. 5 schematically shows a switching line and a convergence speed corresponding to a response assignment parameter for a response assignment control in accordance with one embodiment of the present invention.
Figure 5:
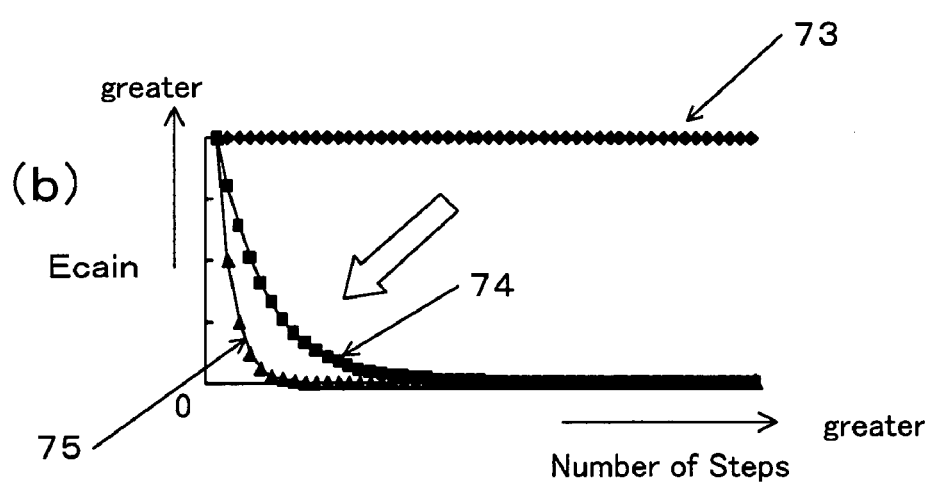

FIG. 5(*a*) shows a phase plane with Ecain(k) on the vertical axis and Ecain(k−1) on the horizontal axis. A switching line 71 expressed by the equation (1-27) is shown in the phase plane. Assuming that a point 72 is an initial value of a state quantity (Ecain(k−1), Ecain(k)), the 2-degree-of-freedom response assignment control places the state quantity on the switching line 71 and then constrains it on the switching line 71. Thus, the state quantity automatically converges to the origin (that is, Ecain (k) and Ecain (k−1)=0) of the phase plane with time because the state quantity is confined within the first-order delay system having no input. By constraining the state quantity on the switching line 71, the state quantity can converge to the origin without being influenced by disturbance.

Referring to FIG. 5(*b*), reference numerals 73, 74 and 75 show the convergence speed when the response assignment parameter POLE for suppressing disturbance takes a value of −1, −0.8, and −0.5, respectively. As the absolute value of POLE becomes smaller, the convergence speed of the error Ecain becomes faster.

An equivalent control input Ueq expressed by the equation (1-22) acts to confine the state quantity on the switching line. Therefore, the equation (1-28) needs to be satisfied.

$$\sigma(k+1) = \sigma(k) \tag{1-28}$$

As shown by the equation (1-22), the equivalent control input Ueq is calculated based on the equation (1-28) and the model expression (2).

Furthermore, the controller 104 calculates a reaching law input Urch (equation (1-23)). The reaching law input Urch is an input for placing the state quantity on the switching straight line 71. Krch represents a feedback gain. The value of the feedback gain Krch is pre-identified through a simulation or the like taking into account the stability, quick responsiveness etc. of the controlled variable.

The controller 104 adds the equivalent control input Ueq to the reaching law input Urch to determine the control input Ucain (equation (1-21)). The control input Ucain is applied to the plant 101.

Figure 6:
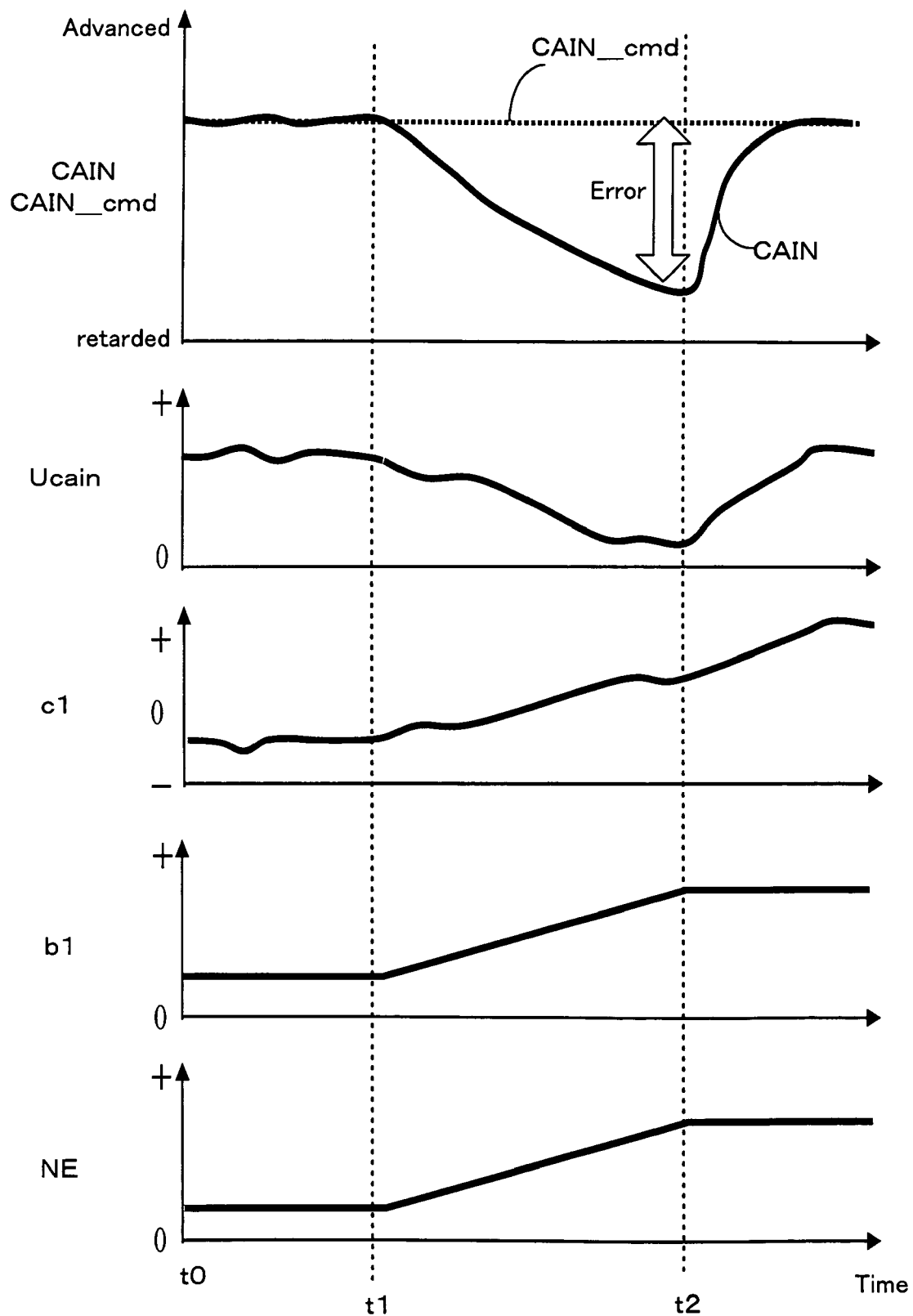
FIG. 6 graphically shows behavior of each parameter in accordance with conventional control.

FIG. 6 shows behavior of each parameter when the plant is controlled by the control apparatus shown in FIG. 3. From time t1 to time t2, the engine rotational speed NE increases. The model parameter b1 increases in accordance with the engine rotational speed NE. The model parameter b1 is used in the denominator of the equations (1-22) and (1-23) for determining the control inputs Ueq and Urch. Therefore, as the model parameter b1 increases, the control input Ucain decreases. As a result, a steady state error occurs. The estimated disturbance value c1 should compensate for the steady state error. However, the steady state error cannot be compensated for completely because only a value (c1/b1) obtained by dividing the estimated disturbance value c1 by the model parameter b1 is reflected in the control input Ucain (see equation (1-22)). Resultantly, the steady state error does not decrease, but rather increases. Thus, since the value (c1/b1) obtained by dividing the estimated disturbance value c1 by the model parameter b1 is reflected in the control input Ucain (that is, only one b1-th of c1 is reflected in the control input), there is a probability that a steady state error caused due to a change in the plant condition may not be compensated for by the estimated disturbance value c1. Thus, it is an object of the present invention to suppress such a steady state error.

EXAMPLE 1

Now, a principle of the present invention will be described referring to a first embodiment of the present invention. A structure of a control apparatus in accordance with the first embodiment is similar to FIG. 3. This embodiment differs from a conventional control described above in the calculation implemented by the adaptive disturbance observer 103 for calculating the estimated disturbance value c1 and in the calculation of the equivalent control input Ueq, which is performed the controller 104.

As described above, the occurrence of a steady state error is caused by the fact that the value obtained by dividing the estimated disturbance value c1 by the model parameter b1 is reflected in the control input Ucain. In other words, a steady state error occurs because the estimated disturbance value c1 is not directly reflected in the control input Ucain, but is reflected in the control input Ucain with being influenced by the model parameter b1.

In order to remove the influence by the model parameter b1 from the estimated disturbance value c1, the model expression (2) is re-defined shown by the equation (3).

$$CAIN(k+1) = a1 \cdot CAIN(k) + a2 \cdot CAIN(k-1) + b1 \cdot Ucain(k) + b2 \cdot Ucain(k-1) + b1 \cdot c1 \quad (3)$$

The equation (3) differs from the equation (2) in that it includes a term in which the estimated disturbance value c1 is multiplied by the model parameter b1. The equivalent control input Ueq is calculated based on this model expression. The calculation of Ueq can be performed in a similar way as described above.

$$Ueq(k) = \frac{1}{b1(k)}\{1 - a1(k) - POLE)CAIN(k) + \quad (1\text{-}31)$$
$$(POLE - a2(k))CAIN(k-1) -$$
$$b2(k)Ucain(k-1)b1(k) \cdot c1(k) +$$
$$CAIN\_cmd\_f(k) +$$
$$(POLE - 1)CAIN\_cmd\_f(k-1) -$$
$$POLE\ CAIN\_cmd\_f(k-2)\}$$
$$= \frac{1}{b1(k)}\{(1 - a1(k) - POLE)CAIN(k) +$$
$$(POLE - a2(k))CAIN(k-1) -$$
$$b2(k)Ucain(k-1) +$$
$$CAIN\_cmd\_f(k) +$$
$$(POLE - 1)CAIN\_cmd\_f(k-1) -$$
$$POLE\ CAIN\_cmd\_f(k-2)\} - c1(k)$$

Referring to such a calculated equivalent control input Ueq, it can be seen that the estimated disturbance value c1 is not calculated (divided) by the model parameter b1 (that is, c1 is not influenced by the model parameter b1), but directly reflected in the control input Ucain. Even when the model parameter b1 abruptly changes in response to a change in the condition of the plant, the estimated disturbance value c1 is not influenced by the model parameter b1. As described above, the estimated disturbance value c1 is calculated so that a steady state error is minimized. Since the value that makes such a steady state error minimum is directly reflected in the control input, the steady state error can be quickly compensated for.

Since the model expression is rewritten, the equations for calculation performed by the adaptive disturbance observer 103 of FIG. 3 are rewritten as follows:

$$c1(k) = c1(k-1) + \frac{Pdov \cdot b1(k)}{1 + b1(k)Pdov\ b1(k)} e\_dov(k) \quad (1\text{-}41)$$

$$e\_dov(k) = CAIN(k) - CAIN\_hat(k) \quad (1\text{-}42)$$

$$CAIN\_hat(k) = \theta^T(k)\zeta(k) \quad (1\text{-}43)$$

$$\theta^T(k) = [a1(k)\ a2(k)\ b1(k)\ b2(k)\ c1(k-1)] \quad (1\text{-}44)$$

$$\zeta^T(k) = \begin{bmatrix} CAIN(k-1) & CAIN(k-2) \\ Ucain(k-1) & Ucain(k-2) & b1(k) \end{bmatrix} \quad (1\text{-}45)$$

The adaptive disturbance observer 103 calculates the estimated disturbance value c1 so that an error between the model output CAIN_hat based on the model expression (3) and the actual plant output CAIN is minimized.

The calculation of c1 can be achieved based on the recursive least squares algorithm as described above. To be brief, e_dov is expressed as (CAIN(k)−a1(k)·CAIN(k−1)−a2(k)·CAIN(k−2)−b1(k)·Ucain(k−1)−b2(k)·Ucain(k−2)−b1(k)·c1(k−1)). Therefore, determining the estimated disturbance value c1 that minimizes e_dov is equivalent to determining the estimated disturbance value c1 that minimizes an error between (CAIN(k)−a1(k)·CAIN(k−1)−a2(k)·CAIN(k−2)−b1(k)·Ucain(k−1)−b2(k)·Ucain(k−2)) and (b1(k)·c1(k−1)). By applying the recursive least squares algorithm to this error, the equation (1-41) for calculating the estimated disturbance value c1 can be derived.

As can be seen from comparison with the equations (1-13) to (1-15) for the conventional adaptive observer, the estimated disturbance value c1 is multiplied by the model parameter b1 in the model output CAIN_hat (equations (1-43) to (1-45)). Further, a multiplication coefficient of the error e_dov uses the model parameter b1 as shown in the equation (1-41). Therefore, when the model parameter b1 changes, that change is reflected in both of the error e_dov and the term associated with the error e_dov. Thus, the convergence speed of the estimated disturbance value c1 to an optimum value can be made quick and hence a steady state error that may occur due to a change of the model parameter b1 can be rapidly suppressed.

Figure 7:
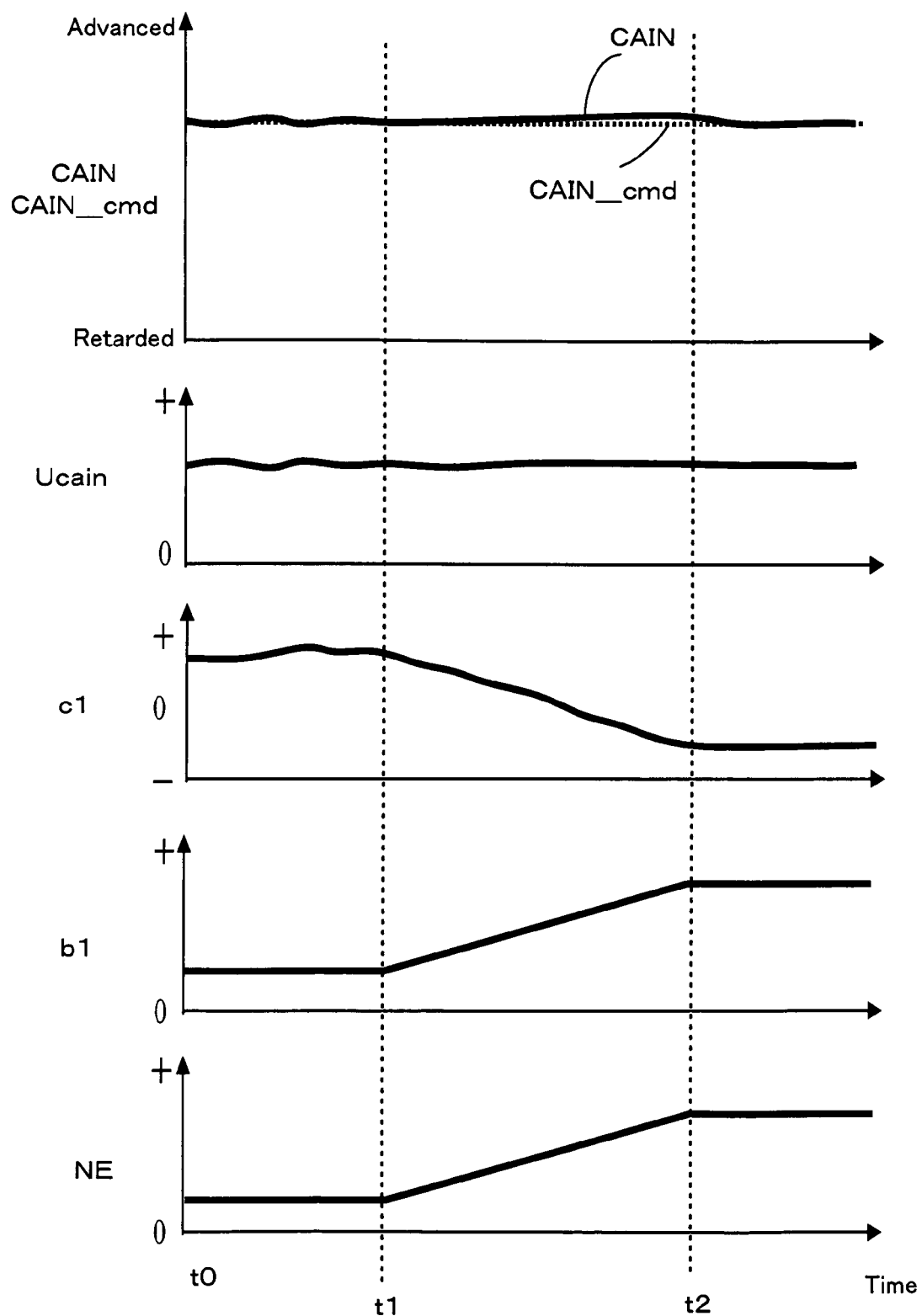
FIG. 7 graphically shows behavior of each parameter by a control in accordance with one embodiment of the present invention.

FIG. 7 shows behavior of each parameter when the plant is controlled by the control apparatus in accordance with the first embodiment of the present invention. Similarly to FIG. 5, from time t1 to time t2, the model parameter b1 increases as the engine rotational speed NE increases. The change of the model parameter b1 has no influence on the estimated disturbance value c1. A steady state error that may occur due to a change of the model parameter b1 is quickly compensated for by the estimated disturbance value c1. As a result, the steady state error is suppressed without increasing.

Thus, by arranging the estimated disturbance value c1 so that it is not influenced (not calculated) by the model parameter b1 in the control input, a steady state error that may occur due to a change of the model parameter b1 can be quickly suppressed.

In this embodiment, the response assignment control is used. Alternatively, any other type of control can be used to cause the controlled variable of the plant to converge to a desired value. It should be noted that even when any other control is used, arranging the estimated disturbance value so that the estimated disturbance value is not calculated (including operation such as adding, subtracting, multiplying, dividing) by the model parameter but directly reflected in the control input into the plant is within the scope of the present invention.

The above-described principle of the present invention can be applied to various embodiments. Several embodiments will be described below. In the following embodiments, the plant model is based on the equation (3).

EXAMPLE 2

Figure 8:
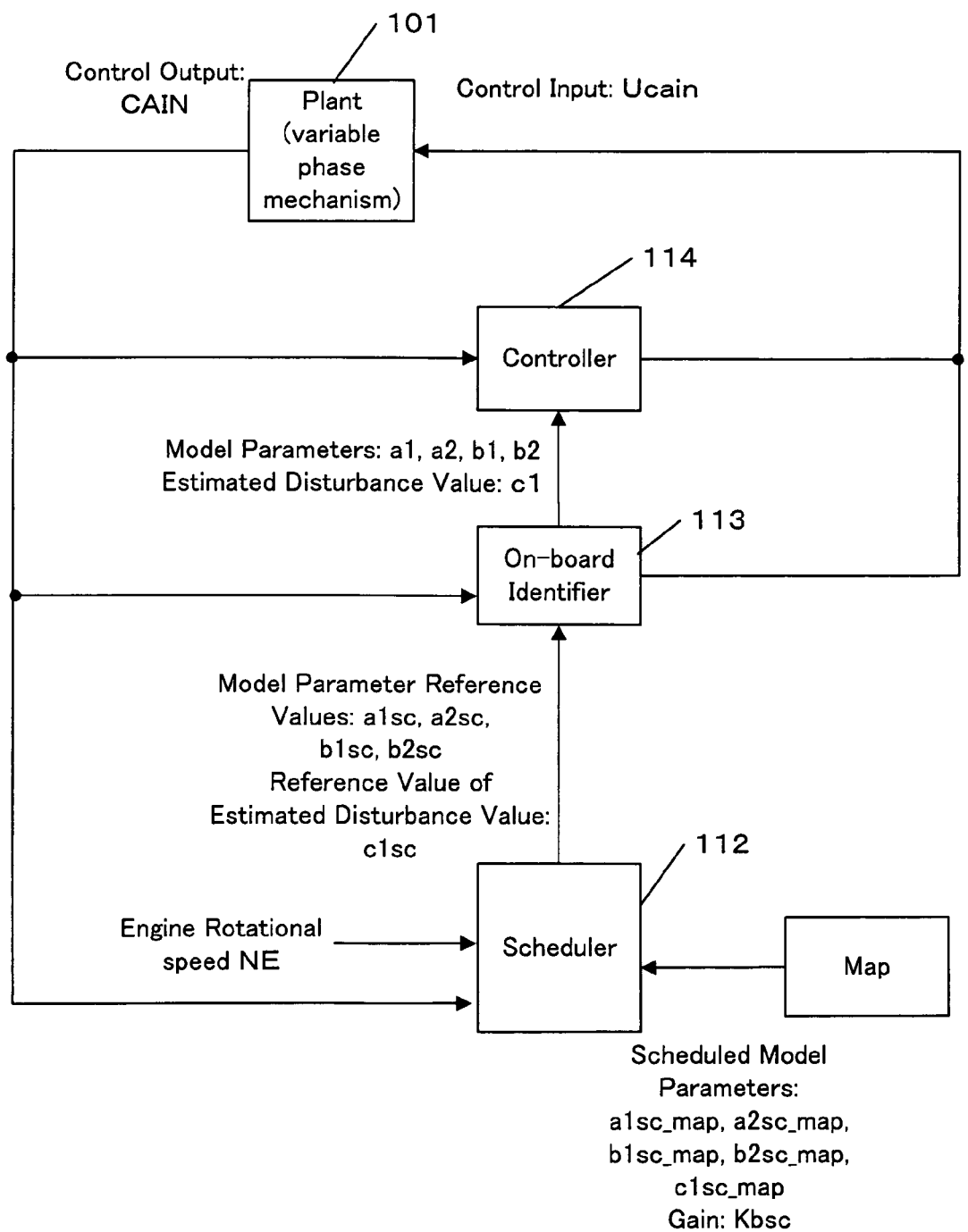
FIG. 8 is a block diagram of a control apparatus in accordance with a second embodiment of the present invention.

FIG. 8 is a block diagram of a control apparatus in accordance with a second embodiment of the present invention. As with the first embodiment, the functions of a scheduler 112, on-board identifier 113 and controller 114 can be implemented in the ECU 1.

Model parameters corresponding to the operating condition of the engine are stored as a table or a map in the memory 1c of the ECU 1. One example of such a map is shown in FIG. 9(a). A scheduler 112 refers to the map based on a detected engine rotational speed NE to extract scheduled model parameters a1sc_map, a2sc_map, b1sc_map, b2sc_map and c1sc_map corresponding to the engine rotational speed NE. As shown in the equations (2-1) and (2-2), the scheduler 112 substitutes the extracted scheduled model parameters a1sc_map and a2sc_map into model parameter reference values a1sc and a2sc, respectively. The scheduler 112 further extracts a gain Kbsc by referring to a map as shown in FIG. 9(b) based on the detected phase CAIN. Model parameter reference values b1sc and b2sc and a reference value c1sc of the estimated disturbance value are calculated by multiplying the scheduled model parameters b1sc_map, b2sc_map and the c1sc_map by the gain Kbsc (equations (2-3) to (2-5)).

$$a1sc(k) \leftarrow a1sc\_map(k) \quad (2\text{-}1)$$

$$a2sc(k) \leftarrow a2sc\_map(k) \quad (2\text{-}2)$$

$$b1sc(k) \leftarrow b1sc\_map \times Kbsc(k) \quad (2\text{-}3)$$

$$b2sc(k) \leftarrow b2sc\_map \times Kbsc(k) \quad (2\text{-}4)$$

$$c1sc(k) \leftarrow c1sc\_map(k) \times Kbsc(k) \quad (2\text{-}5)$$

An on-board identifier 113 corrects the model parameter reference values a1sc, a2sc, b1sc and b2sc to recursively identify model parameters a1, a2, b1 and b2 so that an error between the model output and the actual plant output converges. Furthermore, the identifier 113 corrects the reference value c1sc of the estimated disturbance value to recursively identify an estimated disturbance value c1 so that an error between the model output and the actual plant output converges.

The on-board identifier enables the plant to be well controlled even when dynamic characteristics of the plant deviate from the model due to aging or the like. The model parameters can be quickly identified because the model parameters are identified based on the scheduled model parameters.

In this embodiment, the identification is performed by using the recursive least squares algorithm. The equations for the calculation performed by the identifier are as follows:

$$\theta(k) = \theta\text{base}(k) + d\theta(k) \quad (2\text{-}11)$$

$$d\theta(k) = \delta \cdot d\theta(k-1) + KP(k)e\_id(k) \quad (2\text{-}12)$$

$$KP(k) = \frac{P \cdot \zeta(k)}{1 + \zeta^T(k)P\zeta(k)} \quad (2\text{-}13)$$

$$e\_id(k) = CAIN(k) - CAIN\_hat(k) \quad (2\text{-}14)$$

$$CAIN\_hat(k) = \theta^T(k-1)\zeta(k) \quad (2\text{-}15)$$

$$\theta^T(k) = [a1(k) \ a2(k) \ b1(k) \ b2(k) \ c1(k)] \quad (2\text{-}16)$$

$$\zeta^T(k) = \begin{bmatrix} CAIN(k-1) & CAIN(k-2) \\ Ucain(k-1) & Ucain(k-2) & b1(k) \end{bmatrix} \quad (2\text{-}17)$$

$$\theta base^T(k) = [a1sc(k) \ a2sc(k) \ b1sc(k) \ b2sc(k) \ c1sc(k)] \quad (2\text{-}18)$$

$$d\theta^T(k) = [da1(k) \ da2(k) \ db1(k) \ db2(k) \ dc1(k)] \quad (2\text{-}19)$$

$$\delta = \begin{pmatrix} \delta_1 & 0 & 0 & 0 & 0 \\ 0 & \delta_2 & 0 & 0 & 0 \\ 0 & 0 & \delta_3 & 0 & 0 \\ 0 & 0 & 0 & \delta_4 & 0 \\ 0 & 0 & 0 & 0 & \delta_5 \end{pmatrix} \quad (2\text{-}20)$$

In this embodiment, the on-board identifier 113 uses a δ correction method to identify the model parameters a1, a2, b1, b2 and the estimated value c1 so as to suppress a drift. The δ correction method is described in detail in the Japanese Patent Publication No. 3,304,845 assigned to the assignee of the present application. The δ correction method will be briefly described below.

A recursive identification algorithm in accordance with the δ correction method is expressed by the equation (2-11). A model parameter vector θ(k) is expressed by a sum of its reference value θ_base(k) and its update component dθ(k). δ is a forgetting coefficient vector. Preferably, one of elements $\delta_1, \ldots$ of the forgetting coefficient vector δ is set to a value of 1 and the other elements are set to a value larger than zero and smaller than 1.

According to the δ correction method, the update component dθ is calculated so that an identification error e_id(k) converges (equations (2-12) and (2-14)). KP is a gain, which is recursively calculated (equation (2-13)).

According to the δ correction method, the past value of the update component is multiplied by a forgetting coefficient that is larger than zero and smaller than 1. Therefore, the model parameter vector θ can be stabilized in the neighborhood of the reference value θ_base even if a process for adding the update component to the reference value of the model parameter is repeated when a steady state of the plant continues.

It should be noted that (b1×c1) is contained in the model output CAIN_hat (equations (2-15) to (2-17)). This is because the model expression is re-defined to contain a term in which the estimated disturbance value c1 is multiplied by the model parameter b1 as shown by the above-described equation (3).

In this embodiment, the reference value c1sc of the estimated disturbance estimated value is scheduled in advance, as with the model parameters. By using the reference value c1sc, the estimated disturbance value can be changed in synchronization with changes of the model parameters. Therefore, the estimated disturbance value c1 can be determined so that a steady state error that may occur due to changes of the model parameters can be more quickly suppressed.

The controller 114 calculates a control input Ucain by using the above-described 2-degree-of-freedom response assignment control. The calculation for this control is similar to the first embodiment. A difference from the first embodiment is in that the model parameters a1, a2, b1 and b2 and the estimated disturbance value c1 identified by the on-board identifier 113 are used to calculate the control input Ucain. The equations for the calculation are as follows:

$$Ucain(k) = Ueq(k) + Urch(k) \quad (2\text{-}21)$$

$$Ueq(k) = \frac{1}{b1(k)}\{(1 - a1(k) - POLE)CAIN(k) + \quad (2\text{-}22)$$
$$(POLE - a2(k))CAIN(k-1) - b2(k)Ucain(k-1) +$$
$$CAIN\_cmd\_f(k) + (POLE - 1)CAIN\_cmd\_f(k-1) -$$
$$POLE\ CAIN\_cmd\_f(k-2)\} - c1(k)$$

$$Urch(k) = -\frac{Krch}{b1(k)}\sigma(k) \quad (2\text{-}23)$$

$$\sigma(k) = Ecain(k) + POLE\ Ecain(k-1) \quad (2\text{-}24)$$

$$Ecain(k) = CAIN(k) - CAIN\_cmd\_f(k-1) \quad (2\text{-}25)$$

$$CAIN\_cmd\_f(k) = \quad (2\text{-}26)$$
$$POLE\_f \cdot CAIN\_cmd\_f(k-1) + (1 + POLE\_f) \cdot CAIN\_cmd(k)$$

It should be noted that the estimated disturbance value c1 is not divided by the model parameter b1 in the equivalent control input Ueq (equation (2-22)). Accordingly, even when the model parameter b1 abruptly changes in response to a change in the condition of the plant, the estimated disturbance value c1 is not influenced by the model parameter b1. Because the estimated disturbance value c1 is directly reflected in the control input Ucain, the estimated disturbance value c1 can quickly compensate for a steady state error that may occur due to a change in the plant condition.

EXAMPLE 3

Figure 10:
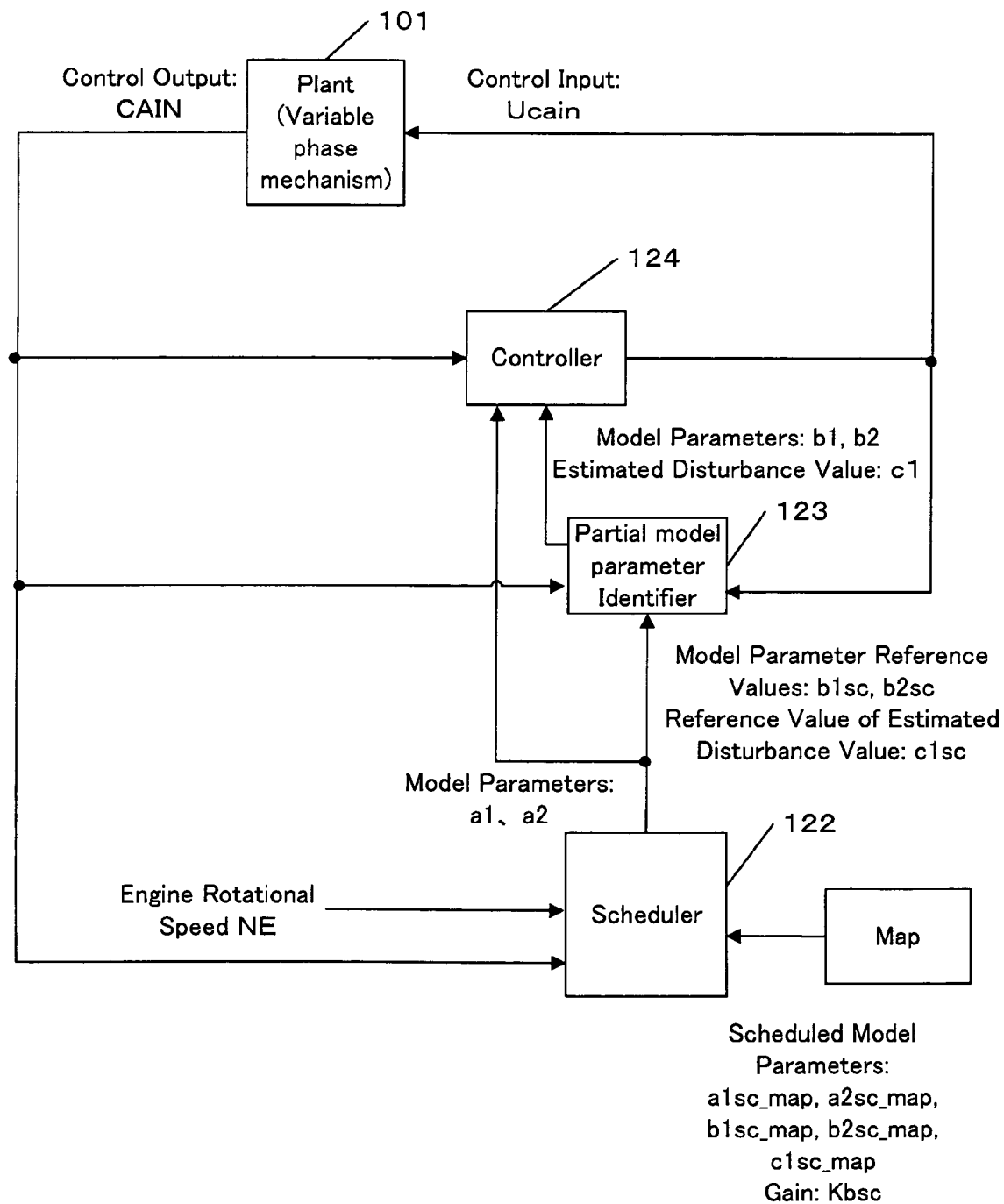
FIG. 10 is a block diagram of a control apparatus in accordance with a third embodiment of the present invention.

FIG. 10 is a block diagram of a control apparatus in accordance with a third embodiment of the present invention. As with the above embodiments, the functions of a scheduler 122, partial model parameter identifier 123 and controller 124 can be implemented in the ECU 1.

Model parameters corresponding to the operating condition of the engine are stored as a table or a map in the memory 1c of the ECU 1. A map as shown in FIG. 9(a) can be used for this embodiment. A scheduler 122 refers to the map based on a detected engine rotational speed NE to extract scheduled model parameters a1sc_map, a2sc_map, b1sc_map, b2sc_map and c1sc_map corresponding to the engine rotational speed NE. As shown in the equations (3-1) and (3-2), the scheduler 122 substitutes the extracted scheduled model parameters a1sc_map and a2sc_map into model parameters a1 and a2, respectively. The scheduler 122 further extracts a gain Kbsc by referring to a map as shown in FIG. 9(b) based on the detected phase CAIN. Model parameter reference values b1sc and b2sc and a reference value c1sc of the estimated disturbance value are calculated by multiplying the scheduled model parameters b1sc_map, b2sc_map and the c1sc_map by the gain Kbsc (equations (3-3) to (3-5)).

$$a1(k) \leftarrow a1sc\_map(k) \quad (3\text{-}1)$$

$$a2(k) \leftarrow a2sc\_map(k) \quad (3\text{-}2)$$

$$b1sc(k) \leftarrow b1sc\_map \times Kbsc(k) \quad (3\text{-}3)$$

$$b2sc(k) \leftarrow b2sc\_map \times Kbsc(k) \quad (3\text{-}4)$$

$$c1sc(k) \leftarrow c1sc\_map(k) \times Kbsc(k) \quad (3\text{-}5)$$

The control apparatus in accordance with this embodiment is provided with a partial model parameter identifier 123 for recursively identifying a portion of the model parameters. In this embodiment, the partial model parameter identifier 123 recursively identifies model parameters b1 and b2 and an estimated disturbance value c1. As for model parameters a1 and a2, the scheduled model parameters a1sc_map and a2sc_map extracted from the map by the scheduler 122 are used.

Now, a partial identification performed by the partial model parameter identifier 123 will be described. A virtual plant is first constructed so as to partially identify the model parameters. Construction of the virtual plant will be described.

The equation (3) is shifted by one step to the past (equation (4)). Model parameters b1(k), b2(k) and c1(k) which are identified in the current cycle are substituted into the shifted equation to derive the equation (5). Then, the model parameters to be identified are collected into the right-hand side (equation (6)).

$$CAIN(k+1) = a1 \cdot CAIN(k) + a2 \cdot CAIN(k-1) + \quad (3)$$
$$b1 \cdot Ucain(k) + b2 \cdot Ucain(k-1) + b1 \cdot c1$$
⇓

$$CAIN(k) = a1 \cdot CAIN(k-1) + a2 \cdot CAIN(k-2) + \quad (4)$$
$$b1 \cdot Ucain(k-1) + b2 \cdot Ucain(k-2) + b1 \cdot c1$$
⇓

$$CAIN(k) = a1 \cdot CAIN(k-1) + a2 \cdot CAIN(k-2) + \quad (5)$$
$$b1(k) \cdot Ucain(k-1) + b2(k) \cdot Ucain(k-2) + b1(k) \cdot c1(k)$$
⇓

$$CAIN(k) - a1 \cdot CAIN(k-1) - a2 \cdot CAIN(k-2) = \quad (6)$$
$$b1(k) \cdot Ucain(k-1) + b2(k) \cdot Ucain(k-2) + b1(k) \cdot c1(k)$$

Here, the left-hand side of the equation (6) is defined as W(k) and the right-hand side is defined as W_hat.

$$W(k) = CAIN(k) - a1 \cdot CAIN(k-1) - a2 \cdot CAIN(k-2) \quad (7)$$

$$W\_hat(k) = b1(k) \cdot Ucain(k-1) + b2(k) \cdot Ucain(k-2) + b1(k) \cdot c1(k) \quad (8)$$

Figure 11:
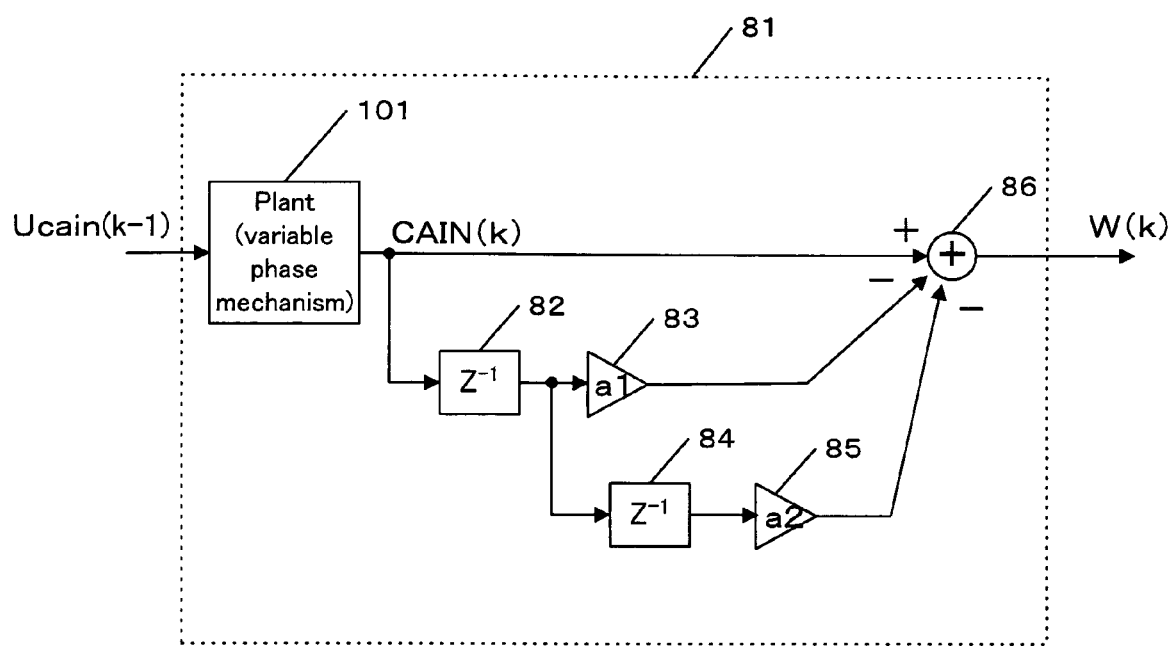
FIG. 11 is a block diagram of a virtual plant in accordance with the third embodiment of the present invention.

W(k) shown by the equation (7) can be regarded as an output of a virtual plant 81 shown in FIG. 11. The output of the virtual plant 81 is determined by subtracting from the actual control output CAIN both a value obtained by multiplying the model parameter a1 83 by CAIN(k−1) which is obtained by delaying the control output CAIN by a delay element 82, and a value obtained by multiplying the model parameter a2 85 by CAIN(k−2) which is obtained by delaying CAIN(k−1) by a delay element 84. The equation (8) can be regarded as a model expression for the virtual model. If there is no modeling error, the output W(k) of the virtual plant 81 becomes equal to the output W_hat(k) of the model of the virtual plant 81.

The partial model parameter identifier 123 identifies the model parameters b1, b2 and c1 in the model expression (8) of the virtual plant 81 by using the recursive least squares algorithm. This calculation is performed as follows:

$$\theta(k) = \theta\text{base}(k) + d\theta(k) \qquad (3\text{-}11)$$

$$d\theta(k) = \delta \cdot d\theta(k-1) + KP(k)e\_id(k) \qquad (3\text{-}12)$$

$$KP(k) = \frac{P \cdot \zeta(k)}{1 + \zeta^T(k)P\zeta(k)} \qquad (3\text{-}13)$$

$$e\_id(k) = W(k) - W\_hat(k) \qquad (3\text{-}14)$$

$$W(k) = CAIN(k) - a1(k)CAIN(k-1) - a2(k)CAIN(k-2) \qquad (3\text{-}15)$$

$$W\_hat(k) = \theta^T(k-1)\zeta(k) \qquad (3\text{-}16)$$

$$\theta^T(k) = [b1(k) \; b2(k) \; c1(k)] \qquad (3\text{-}17)$$

$$\zeta^T(k) = [Ucain(k-1) \; Ucain(k-2) \; b1(k)] \qquad (3\text{-}18)$$

$$\theta base^T(k) = [b1sc(k) \; b2sc(k) \; c1sc(k)] \qquad (3\text{-}19)$$

$$d\theta^T(k) = [db1(k) \; db2(k) \; dc1(k)] \qquad (3\text{-}20)$$

$$\delta = \begin{bmatrix} \delta_1 & 0 & 0 \\ 0 & \delta_2 & 0 \\ 0 & 0 & \delta_3 \end{bmatrix} \qquad (3\text{-}21)$$

A model parameter vector θ(k) is calculated so that a modeling error e_id(k) is removed, that is, so that the actual output W(k) of the virtual plant converges to the output W_hat(k) of the model of the virtual plant (equations (3-11) and (3-12)). P is an identification gain, which has a predetermined value.

The identification technique is based on the δ correction method described referring to the second embodiment. It should be noted that (b1×c1) is contained in the output W_hat of the model of the virtual plant, as with the first and second embodiments (equations (3-16) to (3-18)). This is because the model expression is re-defined to include a term in which the estimated disturbance value c1 is multiplied by the model parameter b1 as shown by the above-described equation (3).

Thus, the time required for the identification process can be shortened by recursively identifying not all of the model parameters but only a portion of the model parameters. Alternatively, other model parameters may be recursively identified. For example, the partial model parameter identifier 123 can be configured to identify only the model parameters a1 and a2.

Similarly to the second embodiment, the reference value c1sc of the estimated disturbance value is used in this embodiment. Accordingly, the time required for causing the estimated disturbance value c1 to converge to an optimum value can be shortened.

A controller 124 calculates a control input Ucain by using the above-described 2-degree-of-freedom response assignment control. The calculation for this control is similar to the first and second embodiments. A difference from those embodiments is in that the model parameters b1 and b2 and the estimated disturbance value c1, which are identified by the partial model parameter identifier 123, and the model parameters a1 and a2, which are established by the scheduler 122, are used to calculate the control input Ucain. The equations for the calculation are as follows:

$$Ucain(k) = Ueq(k) + Urch(k) \qquad (3\text{-}31)$$

$$Ueq(k) = \frac{1}{b1(k)}\{(1 - a1(k) - POLE)CAIN(k) + \qquad (3\text{-}32)$$
$$(POLE - a2(k))CAIN(k-1) - b2(k)Ucain(k-1) +$$
$$CAIN\_cmd\_f(k) + (POLE - 1)CAIN\_cmd\_f(k-1) -$$
$$POLE \; CAIN\_cmd\_f(k-2)\}c1(k)$$

$$Urch(k) = -\frac{Krch}{b1(k)}\sigma(k) \qquad (3\text{-}33)$$

$$\sigma(k) = Ecain(k) + POLE \; Ecain(k-1) \qquad (3\text{-}34)$$

$$Ecain(k) = CAIN(k) - CAIN\_cmd\_f(k-1) \qquad (3\text{-}35)$$

$$CAIN\_cmd\_f(k) = \qquad (3\text{-}36)$$
$$POLE\_f \cdot CAIN\_cmd\_f(k-1) + (1 + POLE\_f) \cdot CAIN\_cmd(k)$$

It should be noted that the estimated disturbance value c1 is not divided by the model parameter b1 in the equivalent control input Ueq (equation (3-32)). The estimated disturbance value c1 is not influenced by the model parameter b1 even when the model parameter b1 abruptly changes due to a change in the condition of the plant. Since the estimated disturbance value c1 is directly reflected in the control input Ucain, a steady state error that may occur due to a change in the condition of the plant can be quickly compensated for by the estimated disturbance value c1.

EXAMPLE 4

Figure 12:
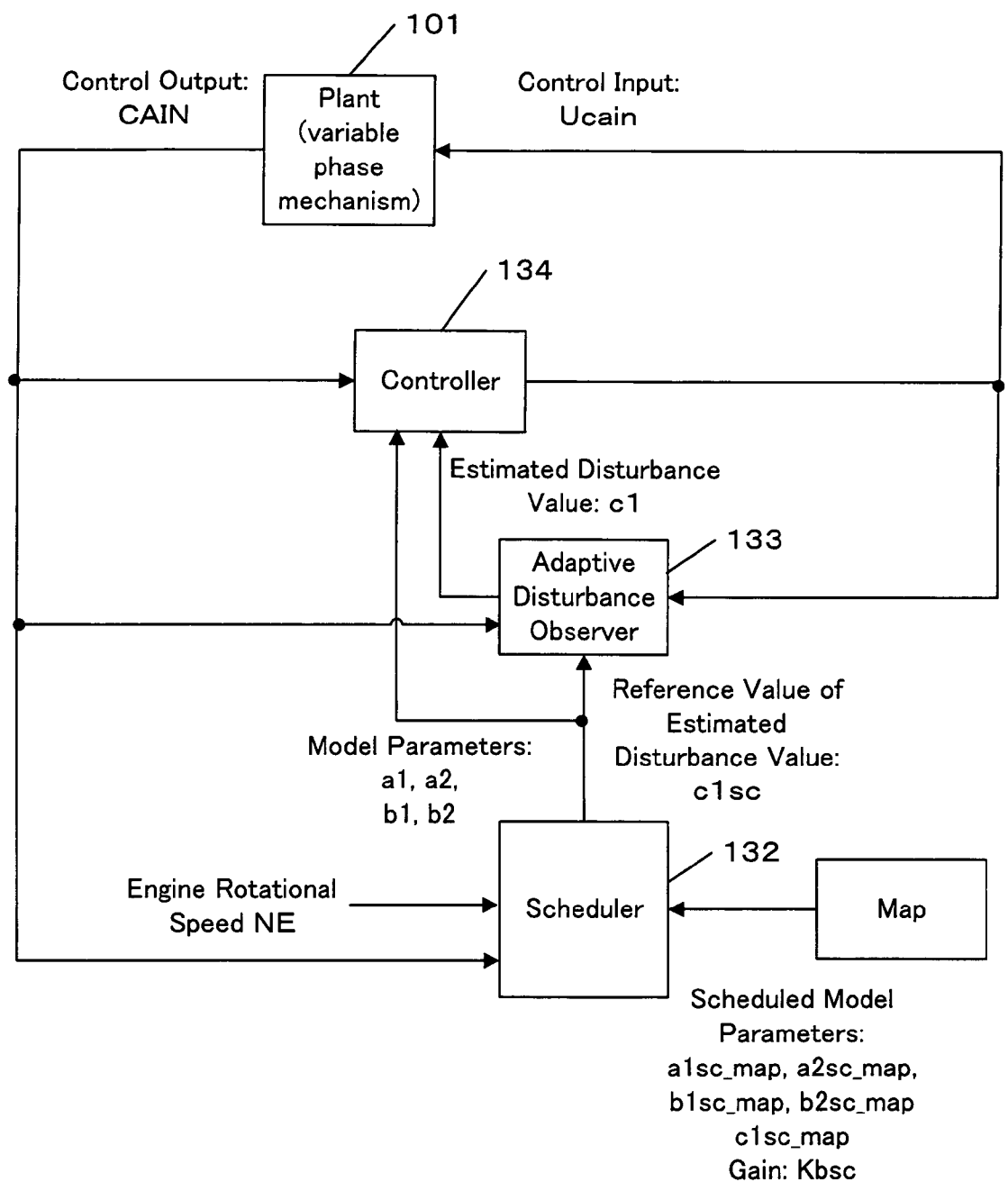
FIG. 12 is a block diagram of a control apparatus in accordance with a fourth embodiment of the present invention.

FIG. 12 is a block diagram of a control apparatus in accordance with a fourth embodiment of the present invention. As with the above embodiments, the functions of a scheduler 132, adaptive disturbance observer 133 and controller 134 can be implemented in the ECU 1.

This embodiment is different from the first embodiment in that an adaptive disturbance observer 133 calculates an estimated disturbance value c1 based on a reference value c1sc of the estimated disturbance value by using the δ correction method.

Figure 9:
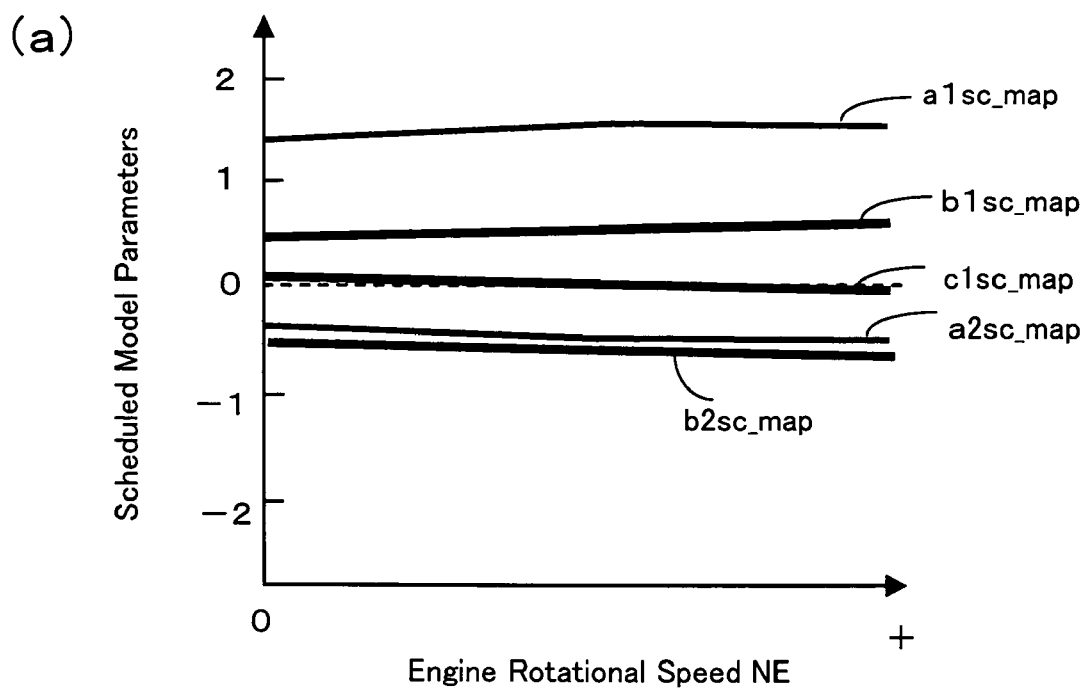
FIG. 9 shows maps used for determining scheduled model parameters in accordance with the second embodiment of the present invention.
Figure 9:
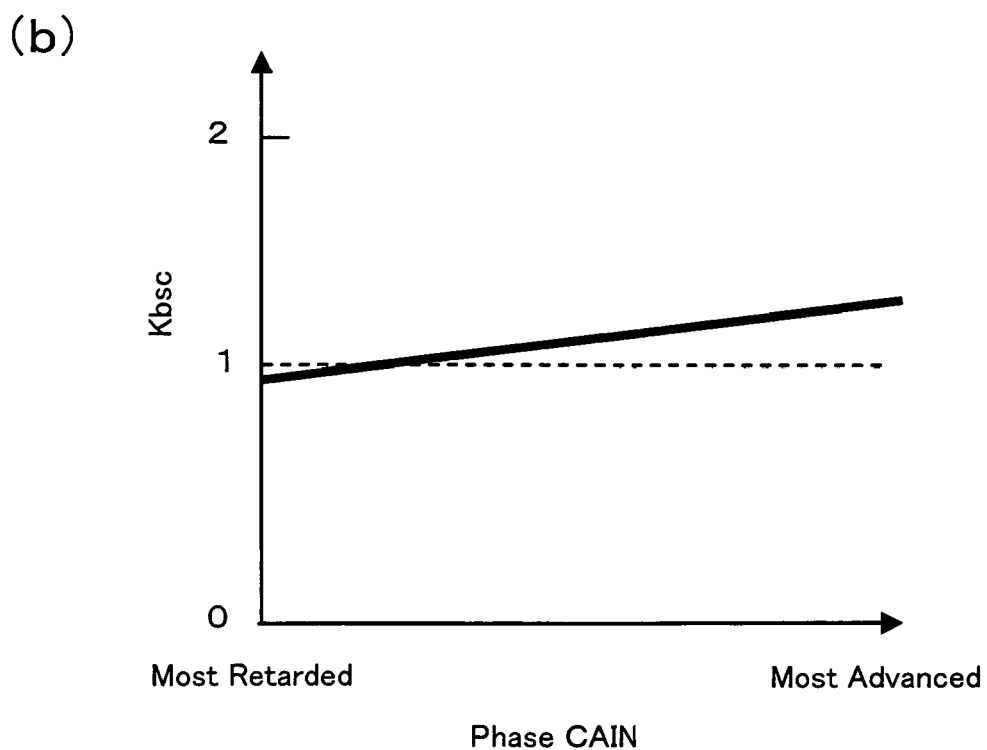

The reference value c1sc of the estimated disturbance value corresponding to the operating condition of the engine is stored as a table or a map in the memory 1c of the ECU 1. A map as shown in FIG. 9(*a*) can be used for this embodiment. A scheduler 132 refers to the map based on a detected engine rotational speed NE to extract scheduled model parameters a1sc_map, a2sc_map, b1sc_map, b2sc_map and c1sc_map corresponding to the engine rotational speed NE. As shown in the equations (4-1) and (4-2), the scheduler 132 substitutes the extracted scheduled model parameters a1sc_map and a2sc_map into the model parameters a1 and a2, respectively. The scheduler 132 further extracts a gain Kbsc by referring to a map as shown in FIG. 9(*b*) based on the detected phase CAIN. The scheduler 132 calculates model parameters b1 and b2 by multiplying the extracted scheduled model parameters b1sc_map and b2sc_map by the gain Kbsc, respectively (equations (4-3) and (4-4)). The scheduler 132 further calculates a reference value c1sc of the estimated disturbance value by multiplying the scheduled model parameter c1sc_map by the gain Kbsc (equation (4-5)).

$$a1(k) \leftarrow a1sc\_map(k) \qquad (4\text{-}1)$$

$$a2(k) \leftarrow a2sc\_map(k) \qquad (4\text{-}2)$$

$$b1(k) \leftarrow b1sc\_map \times Kbsc(k) \qquad (4\text{-}3)$$

$$b2(k) \leftarrow b2sc\_map \times Kbsc(k) \qquad (4\text{-}4)$$

$$c1sc(k) \leftarrow c1sc\_map(k) \times Kbsc(k) \qquad (4\text{-}5)$$

An adaptive disturbance observer 133 uses the δ correction method to calculate the estimated disturbance value c1. This calculation is performed as follows (where a forgetting coefficient can be 0<δ≦1):

$$c1(k) = c1sc(k) + dc1(k) \qquad (4\text{-}11)$$

$$dc1(k) = \delta \cdot dc1(k-1) + KP(k)e\_dov(k) \qquad (4\text{-}12)$$

$$KP(k) = \frac{Pdov \cdot b1(k)}{1 + b1(k)\,Pdov\,b1(k)} \qquad (4\text{-}13)$$

$$e\_dov(k) = CAIN(k) - CAIN\_hat(k) \qquad (4\text{-}14)$$

$$CAIN\_hat(k) = \theta^T(k)\zeta(k) \qquad (4\text{-}15)$$

$$\theta^T(k) = [a1(k) \quad a2(k) \quad b1(k) \quad b2(k) \quad c1(k-1)] \qquad (4\text{-}16)$$

$$\zeta^T(k) = \begin{bmatrix} CAIN(k-1) & CAIN(k-2) \\ Ucain(k-1) & Ucain(k-2) & b1(k) \end{bmatrix} \qquad (4\text{-}17)$$

It should be noted that (b1×c1) is contained in the output CAIN_hat of the model, as with the above-described embodiments (equations (4-15) to (4-17)). This is because the model expression is redefined to include a term in which the estimated disturbance value c1 is multiplied by the model parameter b1 as shown by the above-described equation (3).

A controller 134 calculates a control input Ucain by using the above-described 2-degree-of-freedom response assignment control. The calculation for this control is similar to the above-described embodiments. The equations for the calculation is as follows:

$$Ucain(k) = Ueq(k) + Urch(k) \qquad (4\text{-}31)$$

$$Ueq(k) = \frac{1}{b1(k)}\{(1 - a1(k) - POLE)CAIN(k) + \qquad (4\text{-}32)$$
$$(POLE - a2(k))CAIN(k-1) - b2(k)Ucain(k-1) +$$
$$CAIN\_cmd\_f(k) + (POLE - 1)CAIN\_cmd\_f(k-1) -$$
$$POLE\,CAIN\_cmd\_f(k-2)\} - c1(k)$$

$$Urch(k) = -\frac{Krch}{b1(k)}\sigma(k) \qquad (4\text{-}33)$$

$$\sigma(k) = Ecain(k) + POLE\,Ecain(k-1) \qquad (4\text{-}34)$$

$$Ecain(k) = CAIN(k) - CAIN\_cmd\_f(k-1) \qquad (4\text{-}35)$$

$$CAIN\_cmd\_f(k) = \qquad (4\text{-}36)$$
$$POLE\_f \cdot CAIN\_cmd\_f(k-1) + (1 + POLE\_f) \cdot CAIN\_cmd(k)$$

It should be noted that the estimated disturbance value c1 is not divided by the model parameter b1 in the equivalent control input Ueq (equation (4-32)). The estimated disturbance value c1 is not influenced by the model parameter b1 even when the model parameter b1 abruptly changes due to a change in the condition of the plant. Since the estimated disturbance value c1 is directly reflected in the control input Ucain, a steady state error that may occur due to a change in the condition of the plant can be quickly compensated for by the estimated disturbance value c1.

EXAMPLE 5

The present invention can be applied to various plants. For example, a variable lift mechanism that is capable of variably changing a lift amount of a valve of the engine can be a plant. The variable lift mechanism can be implemented by any appropriate known mechanism.

A model expression of the variable lift mechanism can be shown by the equation (9). LIFT represents an actual lift amount of the valve, which can be detected by using a sensor. Ulift represents a control input into the variable lift mechanism.

$$LIFT(k+1)=a1 \cdot LIFT(k)+a2 \cdot LIFT(k-1)+b1 \cdot Ulift(k)+b2 \cdot Ulift(k-1)+b1 \cdot c1 \qquad (9)$$

Figure 13:
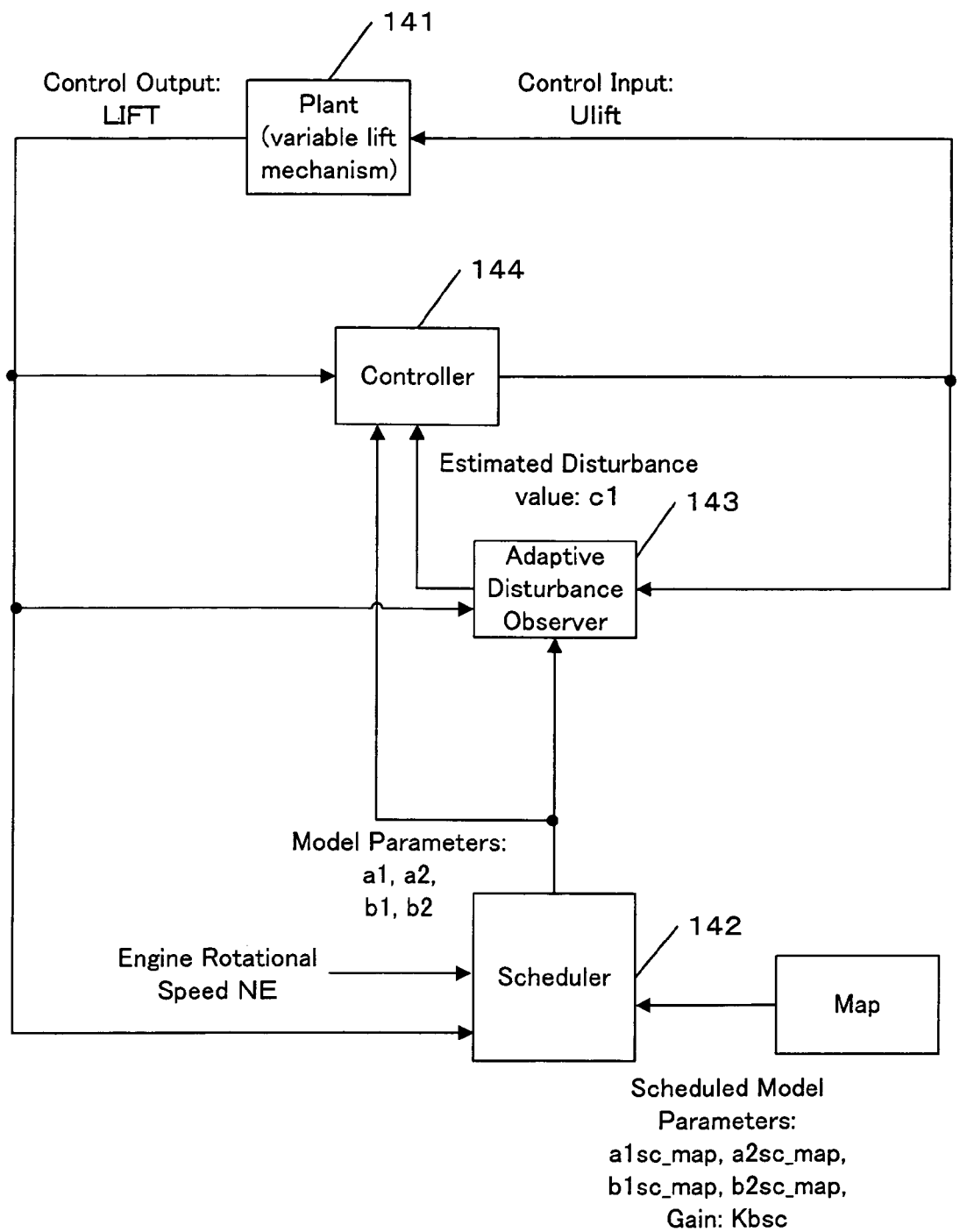
FIG. 13 is a block diagram of a control apparatus in accordance with a fifth embodiment of the present invention.

FIG. 13 shows a block diagram of a control apparatus for controlling the variable lift mechanism. A structure of this control apparatus is based on the first embodiment (FIG. 3). A scheduler 142, an adaptive disturbance observer 143 and a controller 144 perform calculations in a similar way to the first embodiment.

Figure 14:
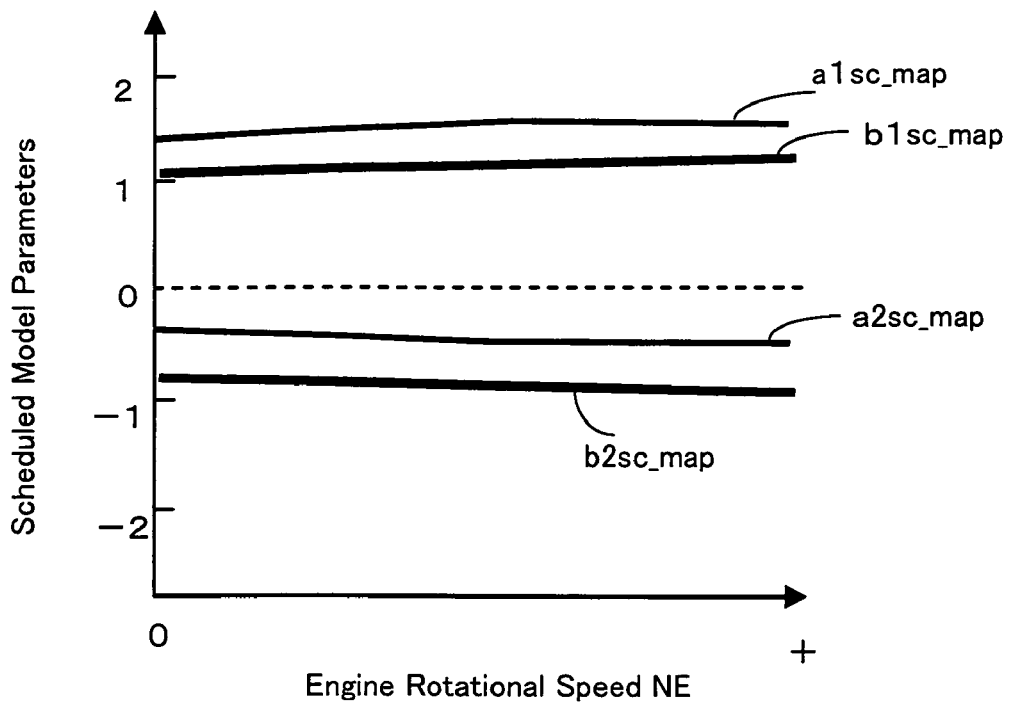
FIG. 14 shows maps used for determining scheduled model parameters in accordance with the fifth embodiment of the present invention.
Figure 14:
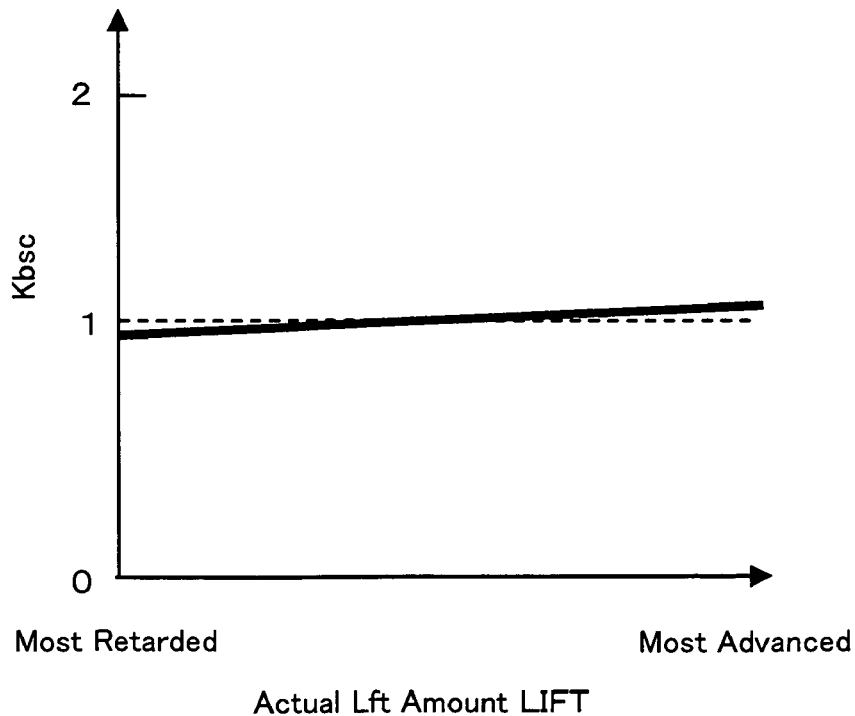

The scheduler 142 extracts scheduled model parameters corresponding to the operating condition of the engine from a map. An example of the map is shown in FIGS. 14(a) and 14(b). The scheduler 142 refers to the map based on a detected engine rotational speed NE and actual lift amount LIFT to determine model parameters a1 to b2, as shown by the equations (5-1) to (5-5).

$$a1(k) \leftarrow a1sc\_map(k) \qquad (5\text{-}1)$$

$$a2(k) \leftarrow a2sc\_map(k) \qquad (5\text{-}2)$$

$$b1(k) \leftarrow b1sc\_map \times Kbsc(k) \qquad (5\text{-}3)$$

$$b2(k) \leftarrow b2sc\_map \times Kbsc(k) \qquad (5\text{-}4)$$

The calculation performed by the adaptive disturbance observer 143 is shown by the equations (5-11) to (5-15).

$$c1(k) = c1(k-1) + \frac{Pdov \cdot b1(k)}{1 + b1(k)\,Pdov\,b1(k)}e\_dov(k) \qquad (5\text{-}11)$$

$$e\_dov(k) = LIFT(k) - LIFT\_hat(k) \qquad (5\text{-}12)$$

$$LIFT\_hat(k) = \theta^T(k)\zeta(k) \qquad (5\text{-}13)$$

$$\theta^T(k) = [a1(k) \quad a2(k) \quad b1(k) \quad b2(k) \quad c1(k-1)] \qquad (5\text{-}14)$$

$$\zeta^T(k) = \begin{bmatrix} LIFT(k-1) & LIFT(k-2) \\ Ulift(k-1) & Ulift(k-2)\,b1(k) \end{bmatrix} \qquad (5\text{-}15)$$

The calculation performed by the controller 144 is shown by the equations (5-21) to (5-26).

$$Ulift(k) = Ueq(k) + Urch(k) \qquad (5\text{-}21)$$

$$Ueq(k) = \frac{1}{b1(k)}\{(1 - a1(k) - POLE)\,LIFT(k) + \qquad (5\text{-}22)$$
$$(POLE - a2(k))LIFT(k-1) - b2(k)Ulift(k-1) +$$
$$LIFT\_cmd\_f(k) + (POLE - 1)LIFT\_cmd\_f(k-1) -$$
$$POLE\,LIFT\_cmd\_f(k-2)\} - c1(k)$$

-continued $$Urch(k) = -\frac{Krch}{b1(k)}\sigma(k) \quad (5\text{-}23)$$

$$\sigma(k) = Elift(k) + POLE\,Elift(k-1) \quad (5\text{-}24)$$

$$Elift(k) = LIFT(k) - LIFT\_cmd\_f(k-1) \quad (5\text{-}25)$$

$$LIFT\_cmd\_f(k) = \quad (5\text{-}26)$$
$$POLE\_f \cdot LIFT\_cmd\_f(k-1) + (1+POLE\_f) \cdot LIFT\_cmd(k)$$

EXAMPLE 6

As one example, a variable compression ratio mechanism that is capable of variably changing a compression ratio within the cylinder of the engine can be a plant. The variable compression ratio mechanism can be implemented by any appropriate known mechanism.

A model expression for the variable compression ratio mechanism can be shown by the equation (10). Cr represents an actual compression ratio, which can be detected by using a sensor. Ucr represents a control input into the variable compression ratio mechanism.

$$Cr(k+1) = a1 \cdot Cr(k) + a2 \cdot Cr(k-1) + b1 \cdot Ucr(k) + b2 \cdot Ucr(k-1) + b1 \cdot c1 \quad (10)$$

Figure 15:
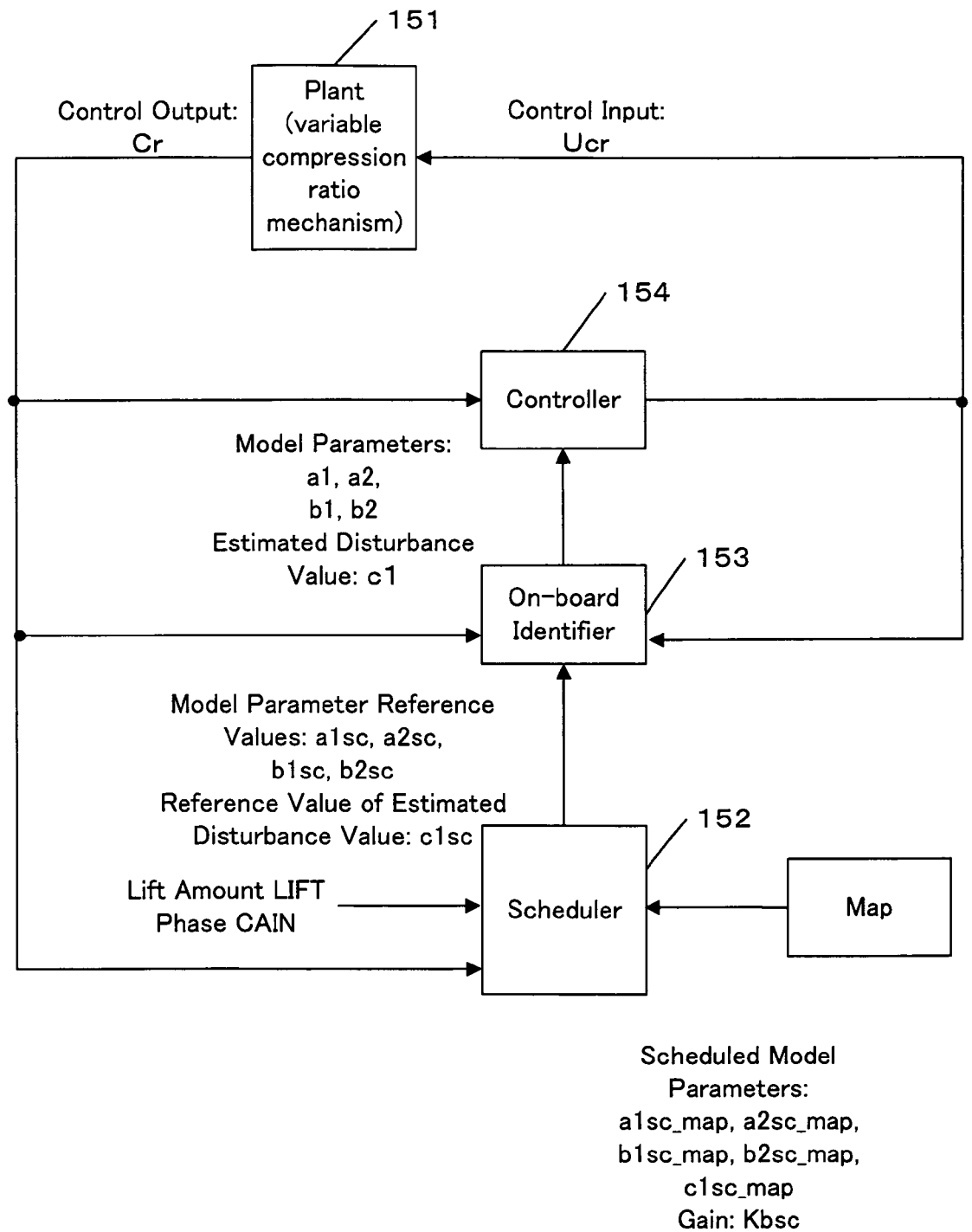
FIG. 15 is a block diagram of a control apparatus in accordance with a sixth embodiment of the present invention.
Figure 16:
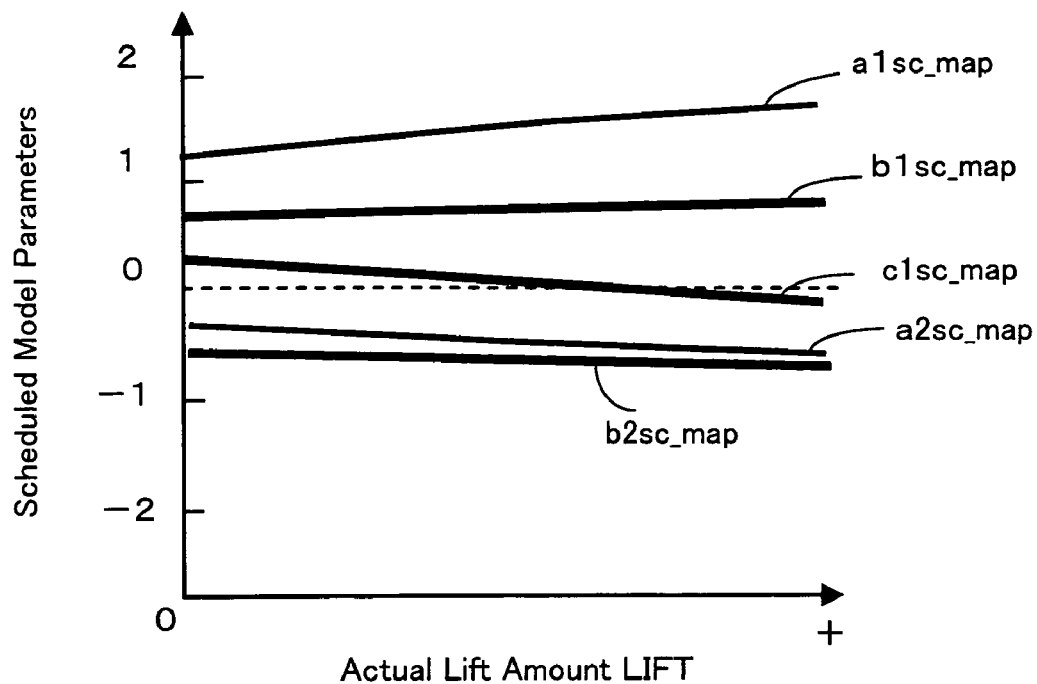
FIG. 16 shows maps used for determining scheduled model parameters in accordance with the sixth embodiment of the present invention.
Figure 16:
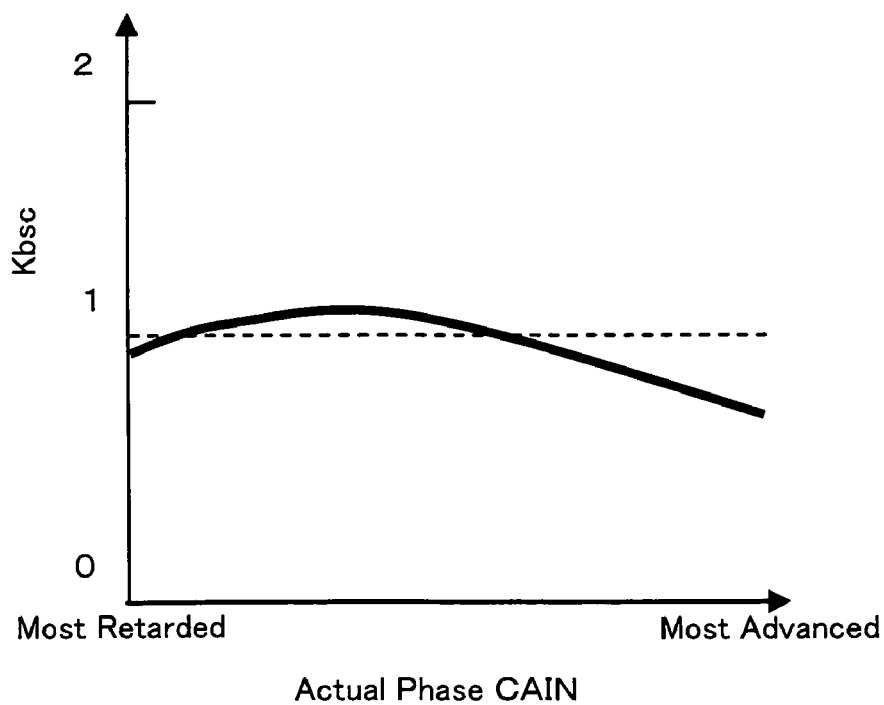

FIG. 15 is a block diagram of a control apparatus for controlling the variable compression ratio mechanism. A structure of this control apparatus is based on the second embodiment (FIG. 8). A scheduler 152, an on-board identifier 153 and a controller 154 perform calculations in a similar way to the second embodiment.

The scheduler 152 extracts scheduled model parameters corresponding to the operating condition of the engine from a map. An example of the map is shown in FIGS. 15(*a*) and 15(*b*).

The scheduler 152 refers to the map based on a detected actual lift amount LIFT and actual phase CAIN to determine reference values of the model parameters and a reference value of the estimated disturbance value as shown by the equations (6-1) to (6-5). In the compression ratio mechanism, a change of the dynamic characteristics in accordance with the engine load is larger than a change of the dynamic characteristics in accordance with the engine rotational speed. Therefore, the reference values of the model parameters and the reference value of the estimated disturbance value are scheduled in accordance with the actual lift amount and the actual phase.

$$a1sc(k) \leftarrow a1sc\_map(k) \quad (6\text{-}1)$$

$$a2sc(k) \leftarrow a2sc\_map(k) \quad (6\text{-}2)$$

$$b1sc(k) \leftarrow b1sc\_map \times Kbsc(k) \quad (6\text{-}3)$$

$$b2sc(k) \leftarrow b2sc\_map \times Kbsc(k) \quad (6\text{-}4)$$

$$c1sc(k) \leftarrow c1sc\_map(k) \times Kbsc(k) \quad (6\text{-}5)$$

The calculation performed by the on-board identifier 153 is shown by the equations (6-11) to (6-20).

$$\theta(k) = \theta base(k) + d\theta(k) \quad (6\text{-}11)$$

$$d\theta(k) = \delta \cdot d\theta(k-1) + KP(k)\,e\_id(k) \quad (6\text{-}12)$$

-continued $$KP(k) = \frac{P \cdot \zeta(k)}{1 + \zeta^T(k)P\zeta(k)} \quad (6\text{-}13)$$

$$e\_id(k) = Cr(k) - Cr\_hat(k) \quad (6\text{-}14)$$

$$Cr\_hat(k) = \theta^T(k-1)\zeta(k) \quad (6\text{-}15)$$

$$\theta^T(k) = [\,a1(k)\ \ a2(k)\ \ b1(k)\ \ b2(k)\ \ c1(k)\,] \quad (6\text{-}16)$$

$$\zeta^T(k) = \begin{bmatrix} Cr(k-1) & Cr(k-2) \\ Ucr(k-1) & Ucr(k-2)\,b1(k) \end{bmatrix} \quad (6\text{-}17)$$

$$\theta base^T(k) = [\,a1sc(k)\ \ a2sc(k)\ \ b1sc(k)\ \ b2sc(k)\ \ c1sc(k)\,] \quad (6\text{-}18)$$

$$d\theta^T(k) = [\,da1(k)\ \ da2(k)\ \ db1(k)\ \ db2(k)\ \ dc1(k)\,] \quad (6\text{-}19)$$

$$\delta = \begin{pmatrix} \delta_1 & 0 & 0 & 0 & 0 \\ 0 & \delta_2 & 0 & 0 & 0 \\ 0 & 0 & \delta_3 & 0 & 0 \\ 0 & 0 & 0 & \delta_4 & 0 \\ 0 & 0 & 0 & 0 & \delta_5 \end{pmatrix} \quad (6\text{-}20)$$

The calculation performed by the controller 154 is shown by the equations (6-21) to (6-26).

$$Ucr(k) = Ueq(k) + Urch(k) \quad (6\text{-}21)$$

$$Ueq(k) = \quad (6\text{-}22)$$
$$\frac{1}{b1(k)}\{(1-a1(k)-POLE)\,Cr(k) + (POLE-a2(k))Cr(k-1) -$$
$$b2(k)Ucr(k-1) + Cr\_cmd\_f(k) + (POLE-$$
$$1)Cr\_cmd\_f(k-1) - POLE\,Cr\_cmd\_f(k-2)\} - c1(k)$$

$$Urch(k) = -\frac{Krch}{b1(k)}\sigma(k) \quad (6\text{-}23)$$

$$\sigma(k) = Ecr(k) + POLE\,Ecr(k-1) \quad (6\text{-}24)$$

$$Ecr(k) = Cr(k) - Cr\_cmd\_f(k-1) \quad (6\text{-}25)$$

$$Cr\_cmd\_f(k) = \quad (6\text{-}26)$$
$$POLE\_f \cdot Cr\_cmd\_f(k-1) + (1+POLE\_f) \cdot Cr\_cmd(k)$$

In the above-described first through fourth embodiments, the model parameters are identified by using the scheduled model parameters. However, the present invention can be applied to an embodiment that has an on-board identifier for recursively identifying model parameters without scheduled model parameters. In this case, an estimated disturbance value can be recursively identified by the on-board identifier. In such an embodiment, according to the present invention, even when the speed that the model parameters are identified is different from the speed that the estimated disturbance value is identified, the estimated disturbance value can be calculated without being influenced by changes of the model parameters, and hence a steady state error can be suppressed. The present invention can be applied to a general-purpose engine (for example, a vessel-propelling engine such as an outboard motor).

What is claimed is:

1. An apparatus for controlling a modeled plant, the plant being represented by a model expression that is based on an input into the plant, an output from the plant, model parameters, and an estimated value for disturbance that is applied to the plant, the model expression including a term in which the estimated disturbance value is multiplied by at least one of the model parameters, comprising:
- an identifier for identifying the model parameters;
- a disturbance calculating unit for calculating the estimated disturbance value so that an error between a model output that is calculated based on the model expression and an actual output of the plant is minimized; and
- a control unit for calculating the input into the plant based on the model expression to control the plant,
- wherein the calculation of the input into the plant based on the model expression including the term in which the estimated disturbance value is multiplied by at least one of the model parameters enables the estimated disturbance value to be included in the input into the plant without being divided or multiplied by any of the model parameters.

2. The apparatus of claim 1, wherein the identifier identifies the model parameters so that an error between the model output that is calculated based on the model expression and the actual plant output is minimized.

3. The apparatus of claim 1, wherein the model parameters include at least one scheduled model parameter having a value that is predetermined in accordance with a condition of the plant,
- wherein the apparatus further comprises a storage device for storing the scheduled parameter,
- wherein the identifier refers to the storage device based on a detected plant condition to extract the scheduled model parameter corresponding to the detected plant condition.

4. The apparatus of claim 1, further comprising a storage device for storing at least one scheduled parameter having a value that is predetermined in accordance with a condition of the plant,
- wherein the identifier refers to the storage device based on a detected plant condition to extract the scheduled model parameter corresponding to the detected plant condition, and corrects the extracted scheduled model parameter so that an error between the model output that is calculated based on the model expression and the actual plant output is minimized.

5. The apparatus of claim 1, further comprising a storage device for storing a reference value of an estimated disturbance value, the reference value being predetermined in accordance with a condition of the plant,
- wherein the disturbance calculating unit refers to the storage device based on a detected plant condition to extract the reference value of the estimated disturbance value corresponding to the detected plant condition, and calculates the estimated disturbance value based on the extracted reference value.

6. The apparatus of claim 1, wherein the plant is a variable phase mechanism that is capable of changing a phase of a cam of an engine.

7. The apparatus of claim 1, wherein the plant is a variable lift mechanism that is capable of changing a lift amount of a valve of an engine.

8. The apparatus of claim 1, wherein the plant is a variable compression ratio mechanism that is capable of changing a compression ratio of an engine.

9. A method for controlling a modeled plant, the plant being represented by a model expression that is based on an input into the plant, an output from the plant, model parameters and an estimated value for disturbance that is applied to the plant, the model expression including a term in which the estimated disturbance value is multiplied by at least one of the model parameters, comprising the steps of:
- identifying the model parameters;
- calculating the estimated disturbance value so that an error between a model output that is calculated based on the model expression and an actual output of the plant is minimized; and
- calculating the input into the plant based on the model expression to control the plant,
- wherein the calculation of the input into the plant based on the model expression including the term in which the estimated disturbance value is multiplied by at least one of the model parameters enables the estimated disturbance value to be included in the input into the plant without being divided or multiplied by any of the model parameters.

10. The method of claim 9, wherein the identifying step further comprises identifying the model parameters so that an error between the model output that is calculated based on the model expression and the actual plant output is minimized.

11. The method of claim 9, wherein the model parameters include at least one scheduled model parameter having a value that is predetermined in accordance with a condition of the plant,
- wherein the identifying step further comprises determining the scheduled model parameter corresponding to a detected plant condition.

12. The method of claim 9, wherein the identifying step further comprises:
- determining based on a detected plant condition a scheduled model parameter, the scheduled model parameter having a value that is predetermined in accordance with a condition of the plant;
- correcting the extracted scheduled model parameter such that an error between the model output that is calculated based on the model expression and an actual plant output is minimized.

13. The method of claim 9, wherein the step of calculating the estimated disturbance value further comprises:
- determining a reference value of the estimated disturbance value corresponding to a detected plant condition; and
- calculating the estimated disturbance value based on the extracted reference value.

14. The method of claim 9, wherein the plant is a variable phase mechanism that is capable of changing a phase of a cam of an engine.

15. The method of claim 9, wherein the plant is a variable lift mechanism that is capable of changing a lift amount of a valve of an engine.

16. The method of claim 9, wherein the plant is a variable compression ratio mechanism that is capable of changing a compression ratio of an engine.

* * * * *